United States Patent
Hawes

(10) Patent No.: US 7,637,070 B2
(45) Date of Patent: Dec. 29, 2009

(54) MODULAR SYSTEM AND METHOD FOR CONSTRUCTING STRUCTURES WITH IMPROVED RESISTANCE TO EXTREME ENVIRONMENTAL CONDITIONS AND COMPONENTS THEREOF

(76) Inventor: Raymond W. Hawes, 541 Pritchards Point Dr., Mt. Pleasant, SC (US) 29464

( * ) Notice: Subject to any disclaimer, the term of this patent is extended or adjusted under 35 U.S.C. 154(b) by 74 days.

(21) Appl. No.: 12/061,994

(22) Filed: Apr. 3, 2008

(65) Prior Publication Data

US 2008/0245017 A1    Oct. 9, 2008

Related U.S. Application Data

(63) Continuation-in-part of application No. 10/776,565, filed on Feb. 11, 2004, now Pat. No. 7,389,621.

(51) Int. Cl.
*E04B 5/10* (2006.01)
*E04C 3/02* (2006.01)
*E04C 3/30* (2006.01)
*E04H 12/00* (2006.01)

(52) U.S. Cl. ............... 52/655.1; 52/647; 52/650.1; 52/696; 52/843; 52/846

(58) Field of Classification Search ............ 52/169.14, 52/239, 282.1–282.3, 647, 650.1, 654.1, 52/655.1, 696, 731.2, 731.7, 732.1
See application file for complete search history.

(56) References Cited

U.S. PATENT DOCUMENTS

| | | | |
|---|---|---|---|
| 2,569,628 A | 10/1951 | Craighead et al. | |
| 3,343,321 A | 9/1967 | Axelsson | |
| 3,559,357 A | 2/1971 | Lowe | |
| 3,676,972 A | 7/1972 | Ballou | |
| 3,782,048 A * | 1/1974 | Corman | 52/282.2 |
| 5,118,217 A | 6/1992 | Younes | |
| 5,590,504 A | 1/1997 | Heard et al. | |
| 5,592,789 A * | 1/1997 | Liddell et al. | 52/63 |
| 5,729,948 A | 3/1998 | Levy et al. | |
| 5,746,535 A | 5/1998 | Kohler | |
| 5,806,268 A | 9/1998 | Koller | |
| 6,185,887 B1 | 2/2001 | Strassle | |
| 6,397,551 B1 | 6/2002 | Lewcock et al. | |
| 6,446,406 B1 | 9/2002 | Sauer | |
| 6,959,211 B2 | 10/2005 | Rule et al. | |
| 6,969,211 B2 | 11/2005 | Altman | |
| 7,004,667 B2 * | 2/2006 | Ludwig et al. | 403/258 |
| 7,096,637 B2 * | 8/2006 | McMillan | 52/653.1 |
| 7,260,919 B1 * | 8/2007 | Spransy et al. | 52/586.1 |

(Continued)

*Primary Examiner*—Richard E Chilcot, Jr.
*Assistant Examiner*—Branon C Painter
(74) *Attorney, Agent, or Firm*—Davis & Bujold, P.L.L.C.

(57) ABSTRACT

Modular structural components and structural connections including chords and forming strips, double chord beams, double beam connectors and modular structural assemblies constructed of double beam chords and connectors and forming modular wall, floor/ceiling and roof assemblies. Each chord has a generally elongated square main body of four main walls surrounding a central bore and having a T-slot structure adapted to accept a bolt type fastener extending along each exterior main surface. Each forming strip is an elongated plate formed into strip segments oriented at right angles to each other and forming a W-shaped corner region, a face region with a bolt hole and an attachment region, each region forming a mating bearing surface with a surface of a chord.

30 Claims, 22 Drawing Sheets

U.S. PATENT DOCUMENTS

| | | | |
|---|---|---|---|
| 2002/0059774 A1 * | 5/2002 | Collins | 52/690 |
| 2002/0189191 A1 * | 12/2002 | Strassle et al. | 52/655.2 |
| 2004/0120759 A1 | 6/2004 | Altman | |

* cited by examiner

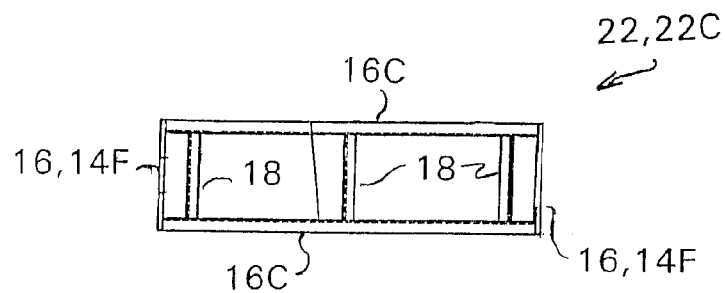
Fig. 2E
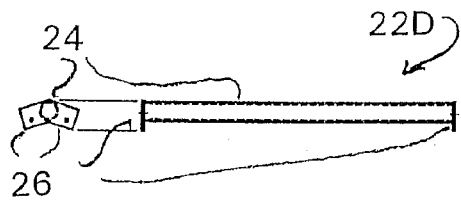
Fig. 2F
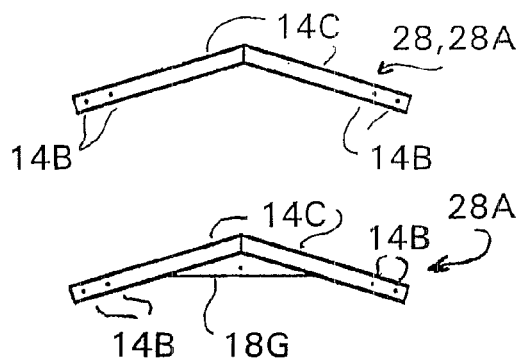
Fig. 2G
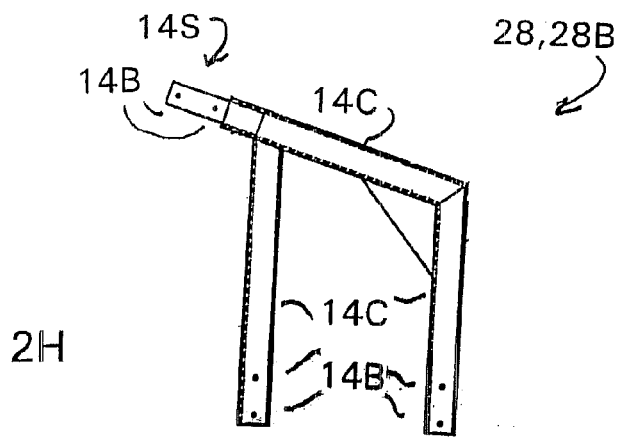
2H

MODULAR SYSTEM AND METHOD FOR CONSTRUCTING STRUCTURES WITH IMPROVED RESISTANCE TO EXTREME ENVIRONMENTAL CONDITIONS AND COMPONENTS THEREOF

This application claims benefit of and is a continuation-in-part application of Ser. No. 10/776,565 filed on Feb. 11, 2004

FIELD OF THE INVENTION

The present invention relates to a method and apparatus for modular construction of structures having high resistance to extreme environmental conditions and, in particular, a system of common modular components for constructing buildings such as houses having improved resistance to extreme environmental conditions such as hurricanes, tornadoes, fires and so on.

BACKGROUND OF THE INVENTION

Recent meteorological events such as the damage to New Orleans and other coastal region communities from hurricanes such as Katrina and recent major tornado, storm and fire damage in communities in virtually every region of the country have emphasized a long standing need for structures, such as houses, schools, stores, governmental, public service and medical facilities and similar structures, having significantly improved resistance to extreme weather conditions. It is also recognized that the advent of global warming will result not only in shifting meteorological patterns and conditions, but more extreme weather conditions. For example, ordinary storms will become stronger and more frequent with higher winds and heavier rainfall, category 4 and 5 hurricanes will become relatively common rather than rare, with the possibility of at least occasional hurricanes of even higher effective categories, and tornadoes will become larger, stronger and more common over larger areas, as will flooding events.

Rapidly accumulating evidence clearly shows that traditional methods for constructing houses, schools, stores, governmental, public service and medical facilities and similar structures are not adequate to meet the increased demands presented by more extreme weather conditions and that while such structures of have been and are presently built in a number of ways, the traditional methods have proven unsatisfactory for various reasons. For example, structures such as houses have commonly been built from wood, such as 2×4s and plywood nailed together or masonry elements, such as bricks, concrete blocks or concrete slabs, held together by mortar and connected to wood elements by nail-like fasteners or adhesives. While nailed wooden structures are relatively light, strong and inexpensive and while the individual components comprising the structures, such as 2×4s and sheets of plywood, are individually relatively strong, their strength is limited by the inherent properties of the materials. Wooden frame structures are also weakened, and tend to be excessively flexible, by the relatively large number of joints necessary to assemble the individual components. Also, nails are commonly used to assembly the individual components of wooden structures because nails are cheaper and easier to use than other forms of fasteners. Nails, however, do not provide joints that are as secure and rigid as those provided by more expensive forms of fasteners and nailed joints tend to flex or come apart relatively readily under various common forms of structural stress. Such measures as are typically taken to make the joints in such structures stronger and more rigid, however, such as bolts, screws, clenched nails and adhesives and combinations thereof, rapidly increase the cost and construction time of the structures. It should also be noted that some of the alternate forms of fasteners, such as the web plates that are often used to assemble rafters and joists and that have large numbers of short protruding spike elements that are driven into abutting joists, typically provide a joint that has strength along only one axis or plane.

Masonry structures, which are typically constructed from a combination of wooden structural elements, such as roofs and floors, and masonry elements such as bricks, blocks and slabs bound together and to the wooden elements by mortar or specialized fasteners, suffer from similar problems, as well as being heavier and more expensive to construct. While such structures may be initially stronger and more rigid than wooden structures, such structures often include even more joints than wooden structures, such as the joints between bricks and blocks, and mortar, for example, is very subject to cracking and sudden failure once a stress limit is reached. In addition, masonry structures are susceptible to stresses that more flexible wooden structures will survive, such as stresses caused by earth movements, such as caused by earthquakes or by wave or landslide erosion, and masonry buildings, unlike wooden structures, will often fail catastrophically and almost completely once failure has started. It must be further noted that masonry structures of often subject to cracking with temperature induced expansion and contraction, as well as settling, and often present ventilation problems, resulting in excess humidity, condensation and possible mold growth.

Structures such as houses, schools, stores, governmental, public service and medical facilities and similar structures have also been constructed from modular iron or steel elements fastened together, for example, with metal pins or bolts or by welding. While this type of structure is generally stronger and more rigid in both the elements and joints than wooden or masonry structures, the significantly greater cost and weight of the structures and the fact that such structures are significantly more difficult, complex and time consuming to construct typically renders such structures impractical except in specific, special circumstances. Other implementations of such structures may use somewhat different materials, such as aluminum or plastic, but have all been found to suffer from one or more of the above discussed disadvantages.

The modular structural system of the present invention as described herein below provides solutions to these and other problems of the prior art.

SUMMARY OF THE INVENTION

The present invention is directed to an apparatus and method for a construction system including a plurality of types of modular structural components and connecting elements for construction of structures such, as houses, having significantly improved resistance to severe environmental conditions. Each structural component includes and is based upon at least one of a plurality of structural elements and includes a connection structure formed of chords and forming strips for structurally attaching a first structural component to a second structural component.

The system of the present invention for constructing environmentally resistant structures includes a plurality of types of modular structural components, each structural component including at least one of a plurality of structural elements. According to the present invention, the structural components include chords, forming strips, double chord beams and double chord beam connectors.

Each chord includes a generally elongated main body having generally square cross section defined by four main walls surrounding a central bore and having four interior main surfaces and four exterior main surfaces, and a T-slot structure extending along and centered on each exterior main surface. Each T-slot structure has an interior T-slot adapted to accept a bolt type fastener, wherein each T-slot includes a shaft slot extending inwards from an outer surface of the T-slot structure and connecting with a cross slot extending at a right angle to the shaft slot at an inner end of shaft slot.

Each forming strip includes a single generally elongated strip plate formed into a plurality of strip segments, each strip segment being oriented at a right angle with respect to an adjacent strip segment and the strip segments being formed into regions. The regions include, in succession, a corner region forming a w-shaped cross section forming bearing surfaces mating with corresponding chord bearing surfaces formed by two adjacent main walls and an adjacent side wall of T-slot structure, a face region forming a bearing surface mating with chord bearing surfaces formed by outer face surfaces of the T-slot structure, and an attachment region extending outwards from an edge of the face region for stiffening of the forming strip.

Each double chord beam includes a pair of parallel chords spaced apart by at least one beam spacer and each double beam connector includes a first pair of parallel chords connected and spaced apart by at least one spacer and a second pair of parallel chords extending orthogonally to the first pair of parallel chords and spaced apart by a spacer with an end of each of the chords of the second pair of parallel chords affixed to one of the chords of the first pair of parallel chords.

In a further embodiment, a double beam connector may further include at least one third pair of parallel chords extending orthogonally to the first pair of parallel chords and spaced apart by a spacer with an end of each of the chords of the at least one third pair of parallel chords affixed to one of the chords of the first pair of parallel chords. In a yet further embodiment, a double beam connector may include at least one fourth pair of parallel chords extending orthogonally to the first and second pairs of parallel chords and spaced apart by a spacer with an end of each of the chords of the at least one third pair of parallel chords affixed to one of the chords of the first pair of parallel chords.

The structural elements of the modular structural components further include modular structural assemblies wherein each modular structural assembly includes a pair of parallel, spaced apart double chord beams connected by purlins extending between at least one corresponding pair of cords of the pair of double chord beams, wherein a purlin is a single beam element formed of one of a single chord and a single forming strip and having a connection element formed of a forming strip located at each end of the single beam element.

The modular structural assemblies may further include a modular wall assembly that includes a pair of parallel, spaced apart double chord beams connected by purlins extending between at least one corresponding pair of cords of the pair of double chord beams. The plurality purlins may include both inner and outer purlins extending between and connected to corresponding inner and outer pairs of chords of the pair of double chord beams and defining inner and outer surfaces of the modular wall assembly.

The modular wall assembly may further include an outer sheathing affixed to the outer purlins of the outer surface of the modular wall assembly and an inner sheathing affixed to the inner purlins of the inner surface of the modular wall assembly. At least the outer sheathing may include a base sheathing affixed to the purlins of the outer surface of the modular wall assembly and a finish sheathing affixed to an outer side of the base sheathing.

Insulation may affixed to the inside surfaces of the outer purlins and may define an inner space located between the insulation and the inner sheathing for accommodation of services.

The structural elements of the modular structural components may further include modular floor/ceiling assemblies and roof assemblies wherein each modular floor/ceiling assembly or modular roof assembly includes a modular structural assembly that includes a pair of parallel, spaced apart double chord beams connected by a plurality of purlins extending between at least an outer pair of chords of the pair of double chord beams and defining an outer surface of the modular structural assembly and an outer sheathing affixed to the outer purlins of the modular wall assembly. The outer sheathing of each modular floor/ceiling assembly and modular roof assembly may further be comprised of a base sheathing affixed to the purlins of the outer surface of the modular wall assembly and a finish sheathing affixed to an outer side of the base sheathing and may include insulation affixed to the inner surfaces of the outer purlins.

BRIEF DESCRIPTION OF THE DRAWINGS

The invention will now be described, by way of example, with reference to the accompanying drawings in which:

FIGS. 2C, 2D 2E and 2F are diagrammatic illustrations of purlin structural components;

FIGS. 2G and 2H are diagrammatic illustrations of roofing structural components;

DETAILED DESCRIPTION OF THE INVENTION

The following describes a system for the construction of structures such as houses, schools, stores, governmental, public service and medical facilities and similar structures from modular common components and having significantly improved resistance to extreme environmental conditions. As will be described in the following, the components of a structural system of the present invention are of light weight and high strength, the number of different types of component parts are limited but allow great flexibility in constructing a wide variety of buildings from a limited set of common components. In addition, the connecting elements of the system of the present invention are, as will be described, strong, rigid and inflexible and allow a structure to be configured to meet virtually any need, including enclosed structures having protective properties. It will also be apparent that structures constructed according to the present invention will be of relatively light weight, that the components of the structures are relatively simple and easy to transport and that will allow rapid assembly and modification of the structures. The structural materials, components and structural fastenings are readily available and relatively inexpensive, thereby significantly reducing the costs of any structure built by the system.

The following will first describe the general components and structure of a generalized structure, such as a house, constructed according to the method and system of the present invention. Section A of the following description will then describe a set of modular structural components as employed in the present invention to construct any generalized structure, such as a generalized house meeting conventional requirements. Sections B and C of the following description will then present more detailed descriptions of a set of primary modular structural components of the present invention, such as chords, forming strips and stub, and the mating of these components for construct a generalized structure of any desired form. The following descriptions will then describe the forms and assembly of the structural components and assemblies discussed in Sections A-C, but as adapted according to the present invention to construct an extreme conditions resistant structure, such as a hurricane-proof house.

Figure 1A:
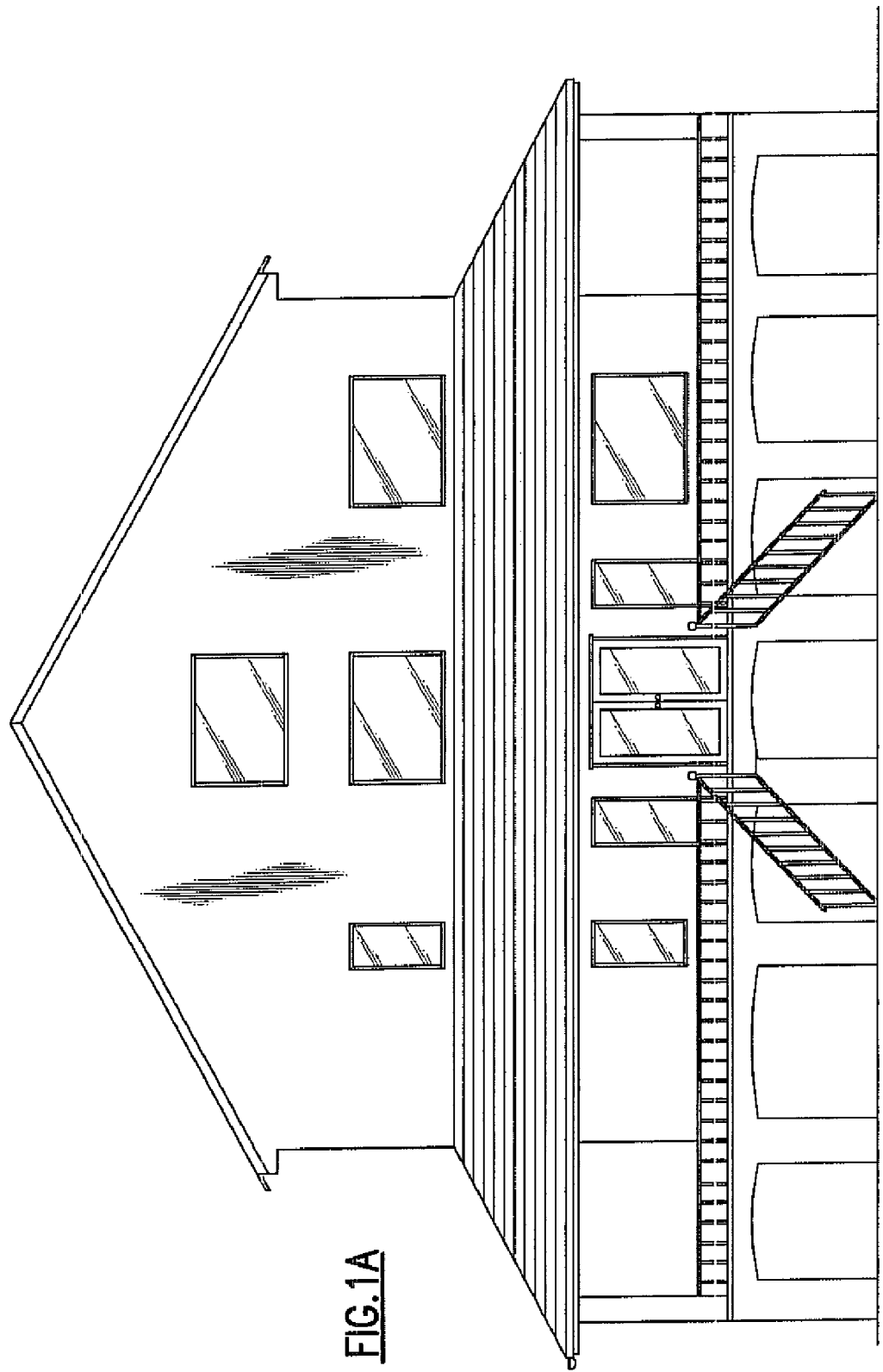
FIGS. 1A and 1B are illustrative diagrammatic representations of a generalized structure constructed with the modular structural components and connection structures of the present invention.
Figure 1B:
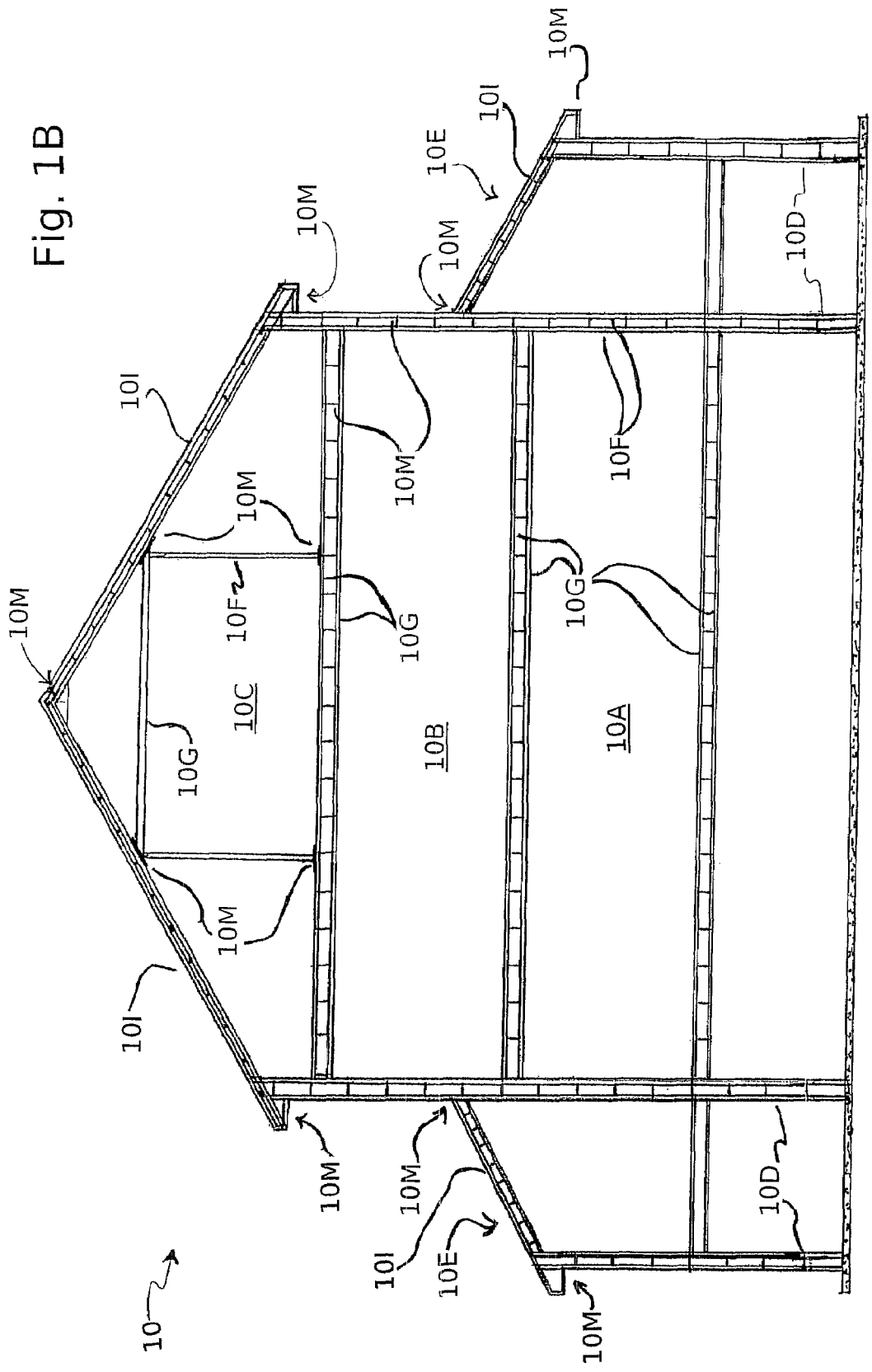

Referring to FIGS. 1A and 1B, therein are shown diagrammatic views of a structure 10, specifically a house, constructed according to the system and method of the present invention. As illustrated in particular in FIG. 1B, structure 10 is of two floors 10A and 10B and an attic space 10C with first floor 10A being raised above ground level on piled foundations comprised of piers 10D with connecting ring beams, balconies on all four sides of the structure 10 and at least one stair 10F extending from ground level to a balcony.

As illustrated in FIG. 1B, the most basic components 12 of the house 10 structure include wall framing elements and assemblies 10F forming the wall framing, floor framing elements and assemblies 10G forming the floor framing, roof framing elements and assemblies 10H forming the rafters and beams supporting roofing 10I, and a relatively small range of detail elements and assemblies 10M performing specialized structural functions, such as joining wall purlins and forming corners, eaves, rafter/wall joins and roof peaks.

It will be understood that other elements of a structure 10 as illustrated in FIGS. 1A and 1B will include foam support/insulation material injected into all wall and floor spaces for insulation, soundproofing and additional structural support and exterior and interior wall sheathing. In this regard, it should be noted that the exterior wall sheathing may be comprised, for example, of plywood or any other suitable sheathing material bolted or adhered to the wall framing elements and interior wall sheathing may be comprised, for example, of wallboard or other suitable interior sheathing attached to the wall framing by, for example, self-tapping screws or adhesives. It will also be understood that electrical, water, waste disposal, heating and cooling facilities and similar systems will be installed in or on the walls, floors, ceilings and so on in any relatively conventional or suitable manner, depending on the purposes, functions and intended characteristics of the structure 10.

It will be appreciated, however, that a structure such as house 10 illustrated in FIGS. 1A-1G represents only a limited part of the range of various types of structures that may be constructed according to the present invention.

Figure 2A:
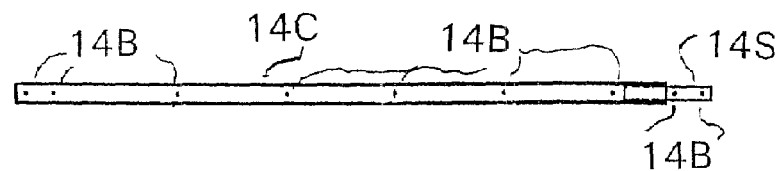
FIG. 2A is a side and a cross sectional view of a chord of the present invention.

Next considering the components 12 that can be used to construct a structure 10, FIGS. 2A-2Y are diagrammatic illustrations of many of the components 12 of the system of the present invention of modular common components for constructing temporary structures such as environment resistant houses 10. As will be seen, the components 12 of the present invention form a complete set of different types of modular components 12 necessary and adequate to construct virtually any desired Structure 10, although it will be appreciated that the selection of components 12 for a given circumstance will vary, depending on the requirements and intended characteristics of the structure. As illustrated in FIGS. 2A-2Y, the selection of components 12 typically include a number of basic, fundamental structural components 12 that are typically common to almost all structures 10, together with certain special or limited purpose components 12 as required for a particular situation.

It should also be noted that certain of the components 12 described herein below are described as being of various standard lengths, which are selected to provide the maximum flexibility in constructing structures 10 while requiring the minimum number of different lengths necessary to achieve the maximum modularity in both the components 12 and the structures 10. In a present embodiment of the invention, for example, the lengths of components 12 may vary between 3 and 12 feet and may include, for example, intermediate modular lengths of 4, 6 and 9 feet.

A. Modular Common Components 12

According to the present invention, and as will be discussed in detail in the following, the components 12 are, in turn, comprised of one or more of a limited number of different types of common structural elements 12E having shapes and functions as defined according to the present invention and wherein the term common component refers to a component shared among or appearing among or as part of a number of other components. As will be described, structural elements 12E will generally include main elements 14, connection elements 16 and reinforcing elements 18 wherein one or more main elements 14 comprise the main structural members of a component 12 and may be comprised of structural members referred to as chords 14C and forming strips 14F. Connection elements 16 in turn comprise the means by which components 12 are connected together to form a structure 10 and are typically formed of forming strips 14F or stubs 16S. Reinforcing elements 18, in turn, are are structural members permanently connected between, for example, the main elements 14 of a component 12, to provide additional strength or form to the basic structure of the component 12 and are typically formed, for example, of sections of pipe or other tubular elements, referred to as reinforcements 18R, or flat metal plates, referred to as gussets 18G.

Figure 2B:
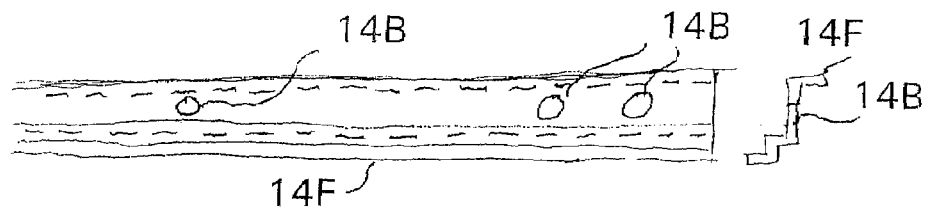
FIG. 2B is a side and a cross sectional view of a forming strip of the present invention.

Next referring to certain of the varieties of components 12 individually, as shown in FIG. 2A a chord 14C is an elongated member having a variable length and the chord 14C cross section illustrated in FIG. 2A while a forming strip 14F is an elongated member of variable length having the forming strip 16FS cross section illustrated in FIG. 2B. It will be understood after the following discussions, however, that components 12 may include yet other standard structural shapes where such other elements would be more suitable for the intended purpose.

In the method and apparatus of the present invention, a typical set of components 12 will include those components 12 most commonly used in a typical structure 10. Such components 12 will typically include straight chords 20 of various lengths, as shown in FIG. 2A, wherein a straight cord 20 has a single main element 14, which is a single chord 14C that is usually positioned vertically and that has a number of bolt holes 14B extending through the diameter of the chord 14C near the ends to engage with one or more connecting elements 16. A straight chord 20 will also typically include bolt holes 14B located along the length of the chord 14C at standard distances or intervals to enable connections to other components 12.

Components 12 may also include various forms of purlins 22 wherein a purlin 22 is a generally beam-like structure. In this regard, it should be noted that the term "purlin" once referred to a specific type of horizontal structural member. The term "purlin" has, in more recent common usage, assumed a general meaning as any type of horizontal structural member and could be extended to include vertically oriented structural members and will be used in this broader sense in the present discussions and descriptions of the invention.

Figure 2C:
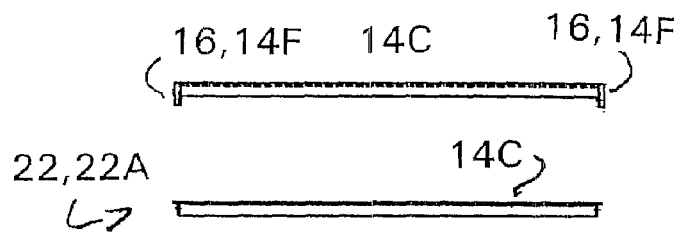

As shown in FIGS. 2C, 2D, 2E and 2F, the various types of purlins 22 typically include single purlins 22A, as shown in FIG. 2C, which are each comprised of a single horizontally positioned main element 14 comprised of a single chord 14C of standard length with a connection element 16 located at each end of the chord 14C. In a typical single purlin 22A, the connection elements 16 are comprised of sections of forming strips 14F attached transversely to the ends of the single purlin 22A, and the main element 14 may in certain alternate embodiments be comprised of a forming strip 14F of the desired length rather than of a chord 14C.

Figure 2D:
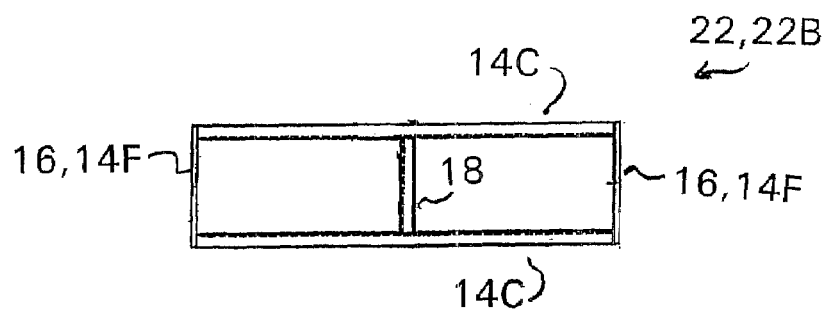

Standard purlins 22B of various lengths are, as shown in FIG. 2D, comprised of upper and lower horizontal main elements 14 with generally vertical reinforcing elements 18 running between the horizontal main elements 14 and a connection element 16 at each end of each of the main elements 14. In a typical implementation of a standard purlin 22B, the horizontal main elements 14 may be comprised of forming strips 14F or chords 14C, the reinforcing elements 18 are typically formed of piping of an appropriate diameter and wall thickness, and the connection elements 16 are each comprised of a vertical section of forming strip 14F extending between the upper and lower horizontal main elements 14.

Platform deck purlins 22C, shown in FIG. 2E, are intended for use as the supporting structures for horizontal platforms or decks, such as may be used to form work platforms, stair landings, exterior deck floors, floors between levels of a structure 10, a runway or slanted ramp between level platforms, and so on. A platform deck purlin 22C is thereby comprised of a parallel pair of horizontally positioned and horizontally spaced apart main elements 14 that are typically comprised of chords 14C but that may be comprised of forming strips 14F, and that are connected by reinforcing elements 18 formed of forming strips 14F extending horizontally between and a right angles to the main elements 14. A connection element 16 comprised of a forming strip 14F extending between and attached to the main elements 14 is located at each end of the platform deck purlin 22C, so that the platform deck purlins 22C may be connected to, for example, horizontally positioned standard purlins 22B. Decking or platform components, such as various types of deck or interior floor materials or underflooring and top finish flooring of all types, may then be laid upon or attached to the top surface of one or more adjacent platform deck purlins 22C to form, for example, a balcony or deck floor or a floor between levels of a structure 10.

Finally, purlins 22 may include ridge purlins 22D which, as shown in FIG. 2F, are configured to form a roof ridge for roofs having various degrees of slant and various lengths. Ridge purlins 22D are of one or more standard lengths and are each comprised of a ridge pivot 24 having two rotating attachment plates 26 rotatably attached to each end to allow the attachment of roof elements to the ridge pivot 24 at the desired or necessary slant angle. In this regard, it should be noted that ridge purlins 22D are designed for a specific purpose as a roof ridge element for roofs having various slant angles rather than as a general use elements, although ridge purlins 22D may be used for other purposes, such as providing a rotating connection. Ridge pivots 24 may be comprised, for example, of piping of a suitable diameter and wall thickness, while rotating attachment plates 26 are simple plates rotatably attached to the ends of ridge pivots 24 and with bolt holes 14B for the attachment of the roof members.

Related roofing components 12 include roofing components 28, which may include ridge chords 28A and double cave sections 28B, shown in FIGS. 2G and 2H, which are respectively used to form a roof peak at a fixed slant angle and to form the eaves of a roof. As illustrated, a ridge chord 28A is comprised of two main elements 14 comprised of chord 14C sections attached at a desired angle and may be constructed with or without a reinforcing gusset 18G in the interior angle between the two chord 14C sections. A double eave section 28B, in turn, is comprised of main elements 14 comprised of chord 14C sections arranged as shown in FIG. 2H and may or may not include reinforcing gussets in the interior angles between the chord 14C sections.

Figure 2I:
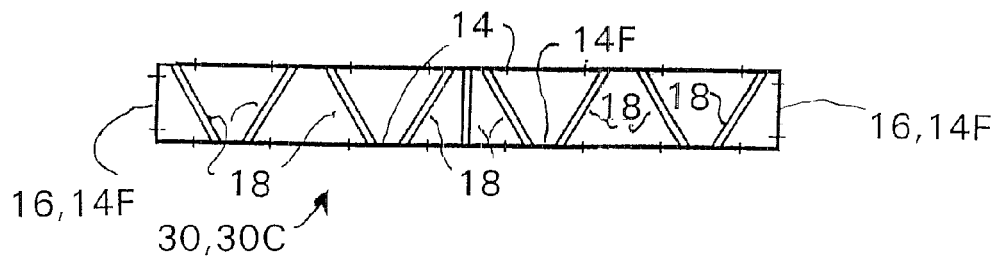
FIGS. 2I, 2J and 2K are diagrammatic illustrations of lattice truss structural components.

Other components 12 include, for example, various lattice trusses 30 and braces 32 wherein lattice trusses 30 are in many respects similar to purlins 22 but which are designed primarily as a structural strengthening component rather than as a connecting or attachment element. As such, one of the primary differences between lattice trusses 30 and purlins 22 is that, in accordance with their intended function, the reinforcements 18R are positioned at an angle to the main elements 14 rather than perpendicular to the main elements 16. As illustrated in FIGS. 2G, 2H and 2I, small ridge lattices 30A, small eave lattices 30B and lattice trusses 30c are generally comprised of two vertically spaced apart, parallel, horizontal main elements 14 interconnected by a number of reinforcements 18R extending at an angle between the main elements 14 and having connection elements 16 extending vertically between the main elements 14 at the ends of the main elements 14.

Figure 2J:
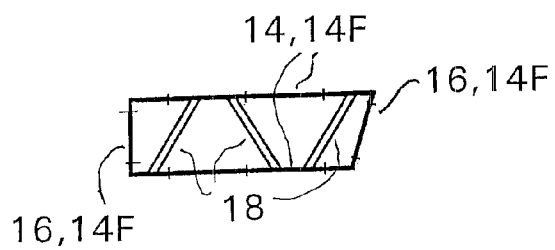
Figure 2K:
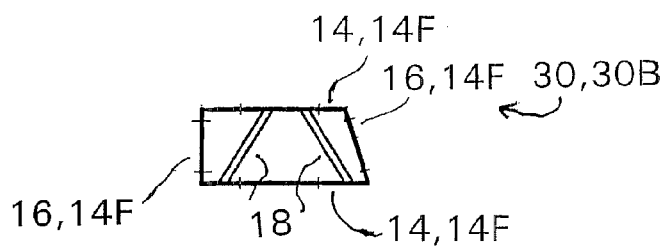

As may be seen from FIGS. 2I, 2J and 2K, the primary differences between the various forms of lattice trusses 30 are in the dimensions and outline forms of the lattice trusses 30, with, for example, a lattice truss 30C forming an elongated rectangle while small ridge lattices 30A and small eve lattices 30B and proportionally shorter in the horizontal direction and have one end at an angle with respect to the overall rectangular shape of the lattice. In general, the main elements 14 of lattice trusses 30 may be comprised of forming strips 14F, while connection elements 16 are normally comprised of sections of forming strips 14F and the reinforcing elements 18 are most typically comprised of piping reinforcements 18R of an appropriate diameter and wall thickness.

Figure 2L:
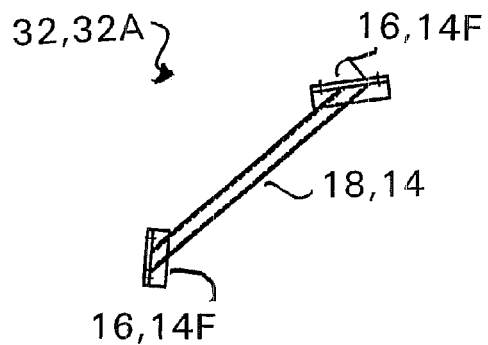
FIGS. 2L, 2M and 2N are diagrammatic illustrations of brace structural components.
Figure 2M:
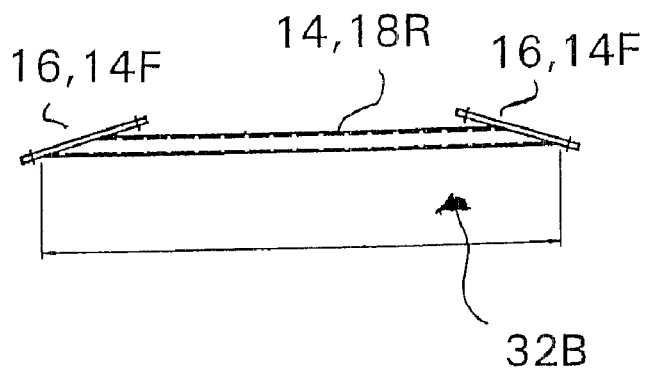
Figure 2N:
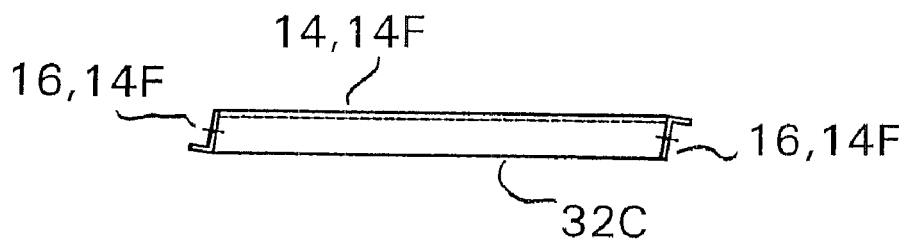

Braces 32, shown in FIGS. 2L, 2M and 2N, may include knee braces 32A, cross-tie braces 32B and diagonal braces 32C, each of which is comprised of a main element 14 running at an angle between two other structural components 12 as a reinforcement 18, such as between a purlin 22 and a straight cord 20. Each brace 32 also includes a connection element 16 mounted at each end of and at an angle to the longitudinal axis of the main element 14 to form a mating connection with the components 12 supported by the brace 32. The main elements 14 of braces 32 are typically comprised of sections of chords 14C, forming strips 14F or reinforcements 18 and the connection elements 18 are typically comprised of sections of forming strip 14F.

Figure 2O:
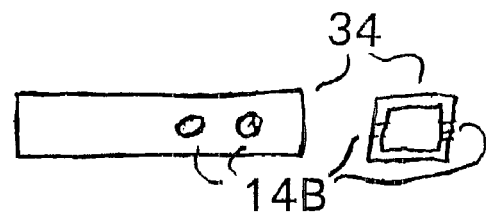
FIG. 2O is a diagrammatic illustration of a stub structural component.
Figure 2P:
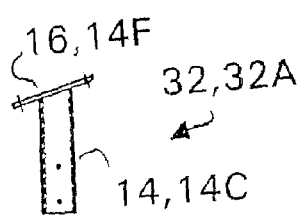
FIGS. 2P, 2Q, 2R, 2S, 2T, 2U and 2V are diagrammatic illustrations of bracket structural components.
Figure 2Q:
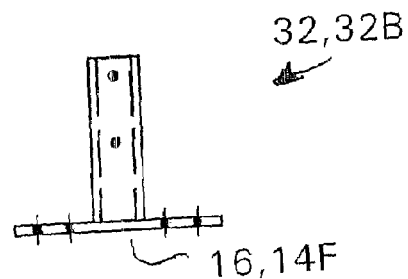
Figure 2R:
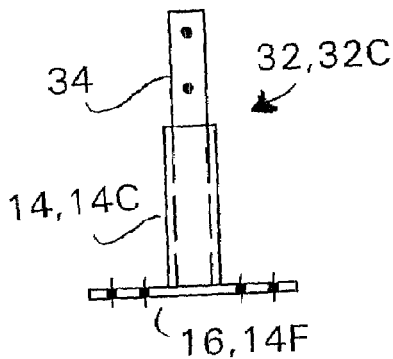
Figure 2S:
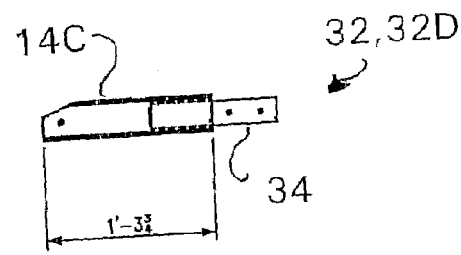
Figure 2T:
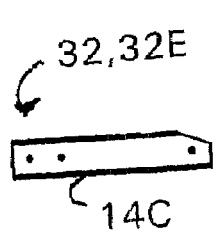
Figure 2U:
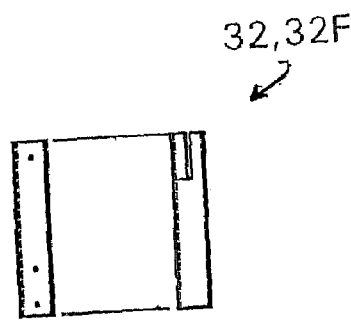
Figure 2V:
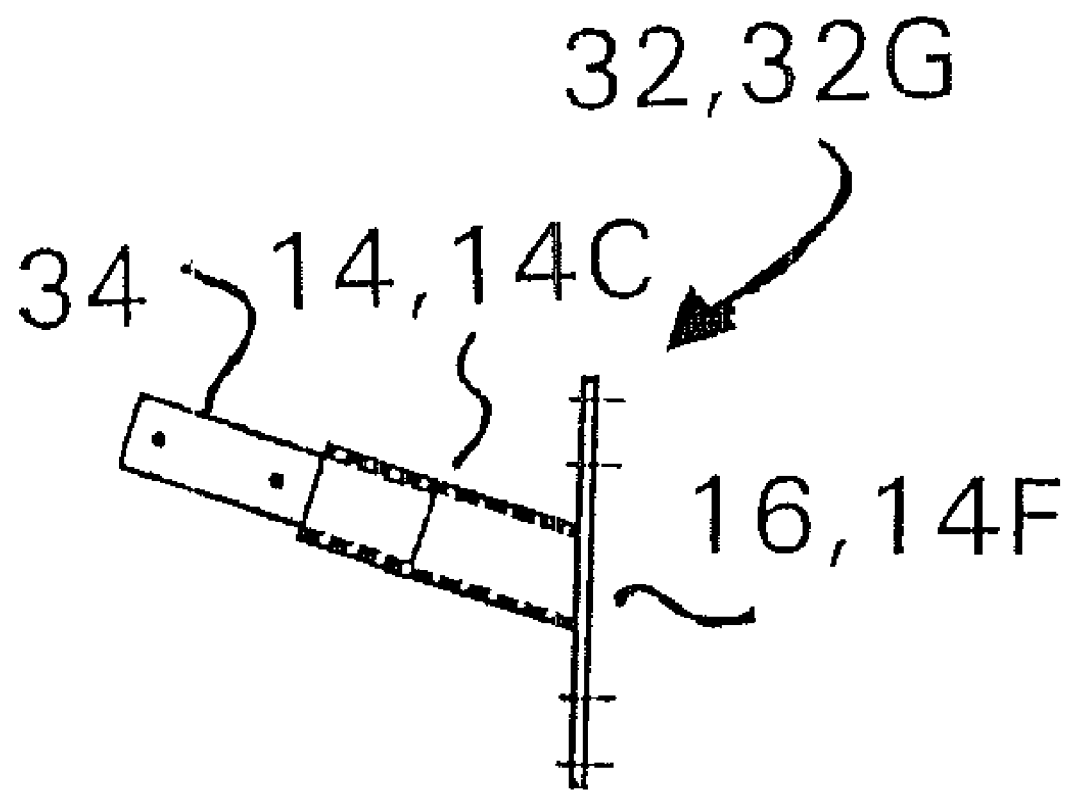

Yet other components 12, illustrated in FIGS. 2P and 2O, include stubs 34 and brackets 32 wherein stubs 34 provide axial connections between, for example, two straight chords 20 or between a straight chord 20 and a bracket 32 or between two chord 14C elements. A stub 34 is comprised of a length of square cross section tubing dimensioned to slidingly fit within the square cross section longitudinal opening in a section of a chord 14C, as illustrated, for example, in the following FIGS. 3A-3E. A stub 34 is also typically provided with two transverse openings, identified as bolt holes 14B, located in one half of the length of the stub 30 and corresponding to bolt holes 14B through a section of chord 14C to affix the stub 30 into a mating engagement with the section of chord 14C by means of, for example, a T-bolt or a standard hex bolt passing through the transverse openings, as also further illustrated in the following FIGS. 3A-3E as well as in FIGS. 2A-2Y.

As indicated in FIGS. 2P-2W, brackets 32 may include drop brackets 32A, male and female stub brackets 32B and 32C, male and female brackets 32D and 32E, ridge drop brackets 32F, bottom truss brackets 32G and single base plates 32H, all of which are designed to facilitate an attachment of one component 12 to another by means of a stub 30. As illustrated, each bracket 32 includes at least one main element 14 comprised of a section of a chord 14C and one or more connection elements 16 for attachment of the bracket 32 to another component 12 wherein each connection element 16 may be comprised, for example, of a section of a forming strip 14F or of a flat plate welded to a main element 14 and having bolt holes 14B for attachment by means of, for example, T-bolts or standard hex bolts.

B. Primary Structural Elements 12E—Chords 14C. Forming Strips 14F and Stubs 34

Referring again to FIGS. 2A-2Y will be apparent from the above descriptions of the components 12 of the system of modular common components for constructing temporary structures of the present invention that components 12 and the sub-components of components 12 are essentially comprised of certain primary structural elements 12E, together with certain common elements, such as tubing for reinforcing elements, and a few relative rare elements, such as wheel assemblies. As described, the primary structural elements 12E include chords 14C of various lengths, forming strips 14F of various lengths, connection elements 16 and stubs 34.

Figure 3A:
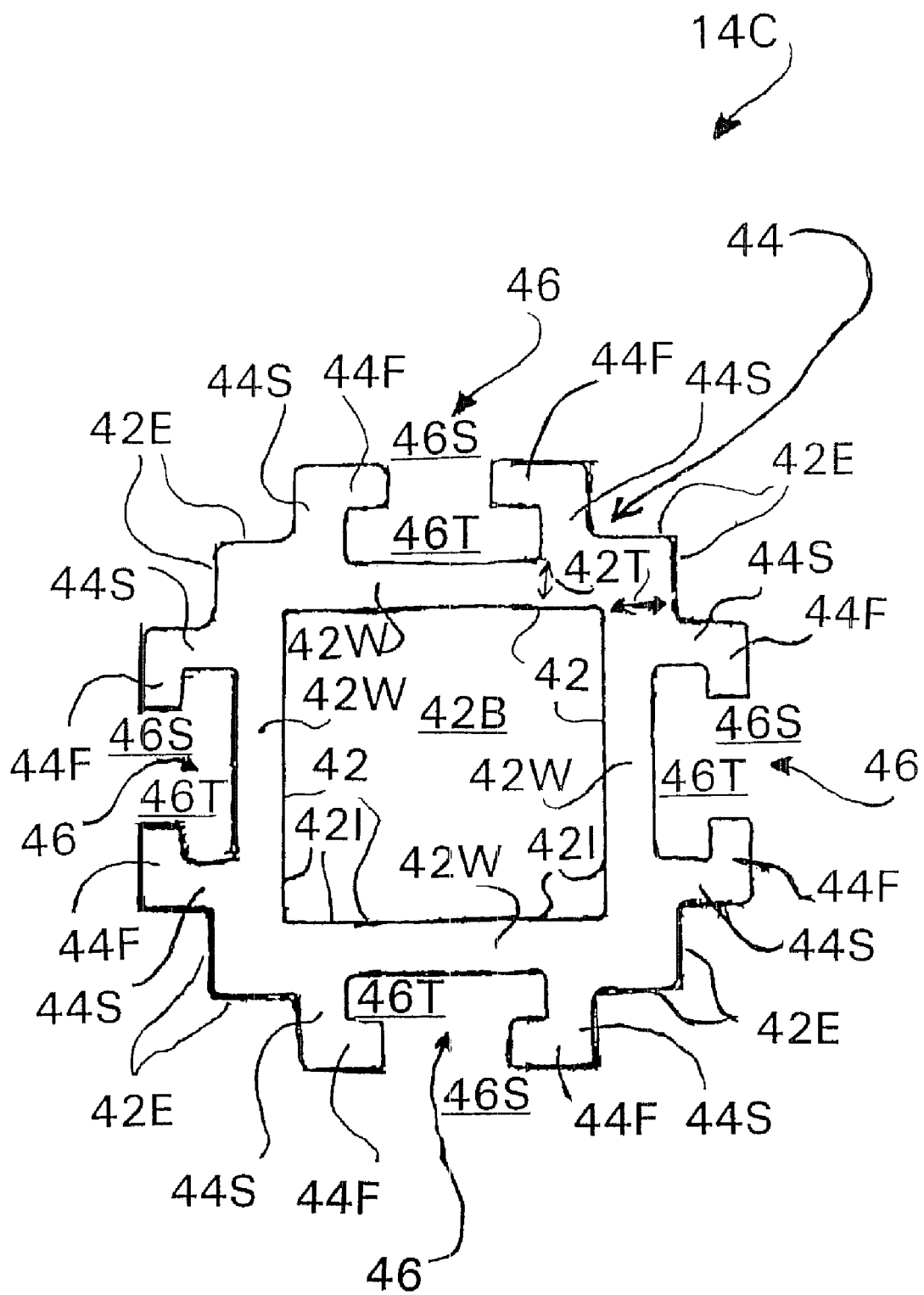
FIGS. 3A and 3B are cross section views of a chord of the present invention.
Figure 3B:
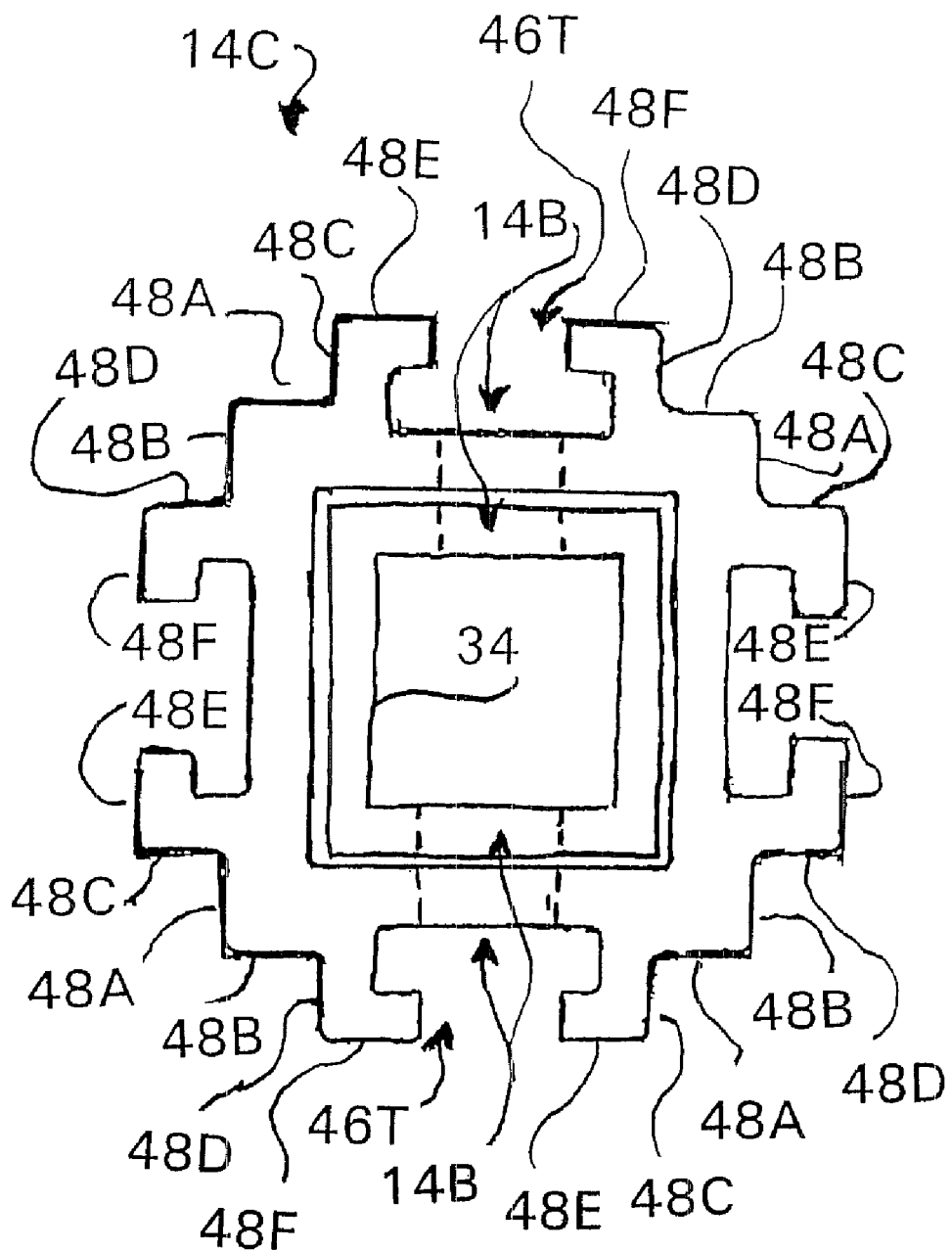
Figure 3C:
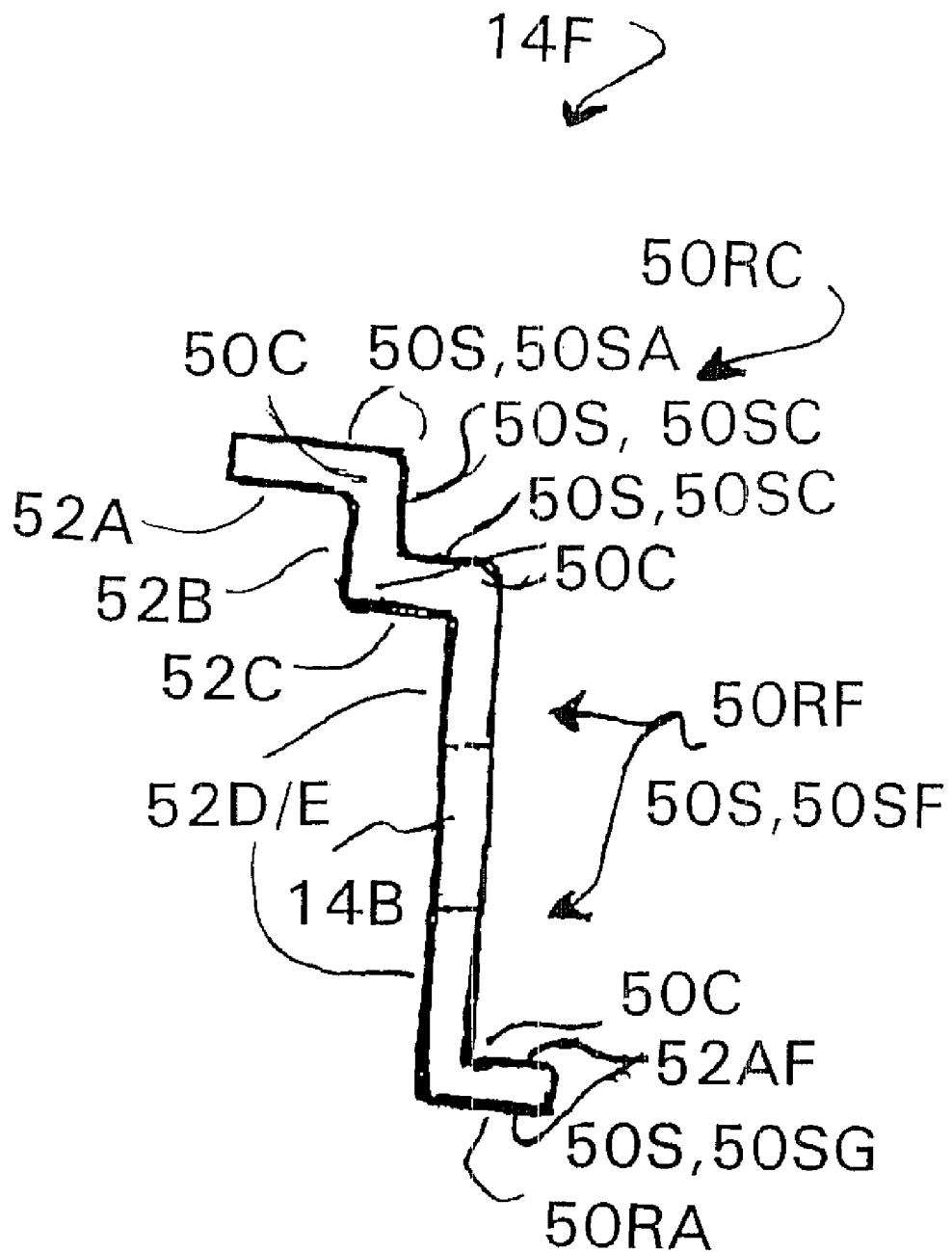
FIG. 3C is a cross section view of a forming strip of the present invention.
Figure 3D:
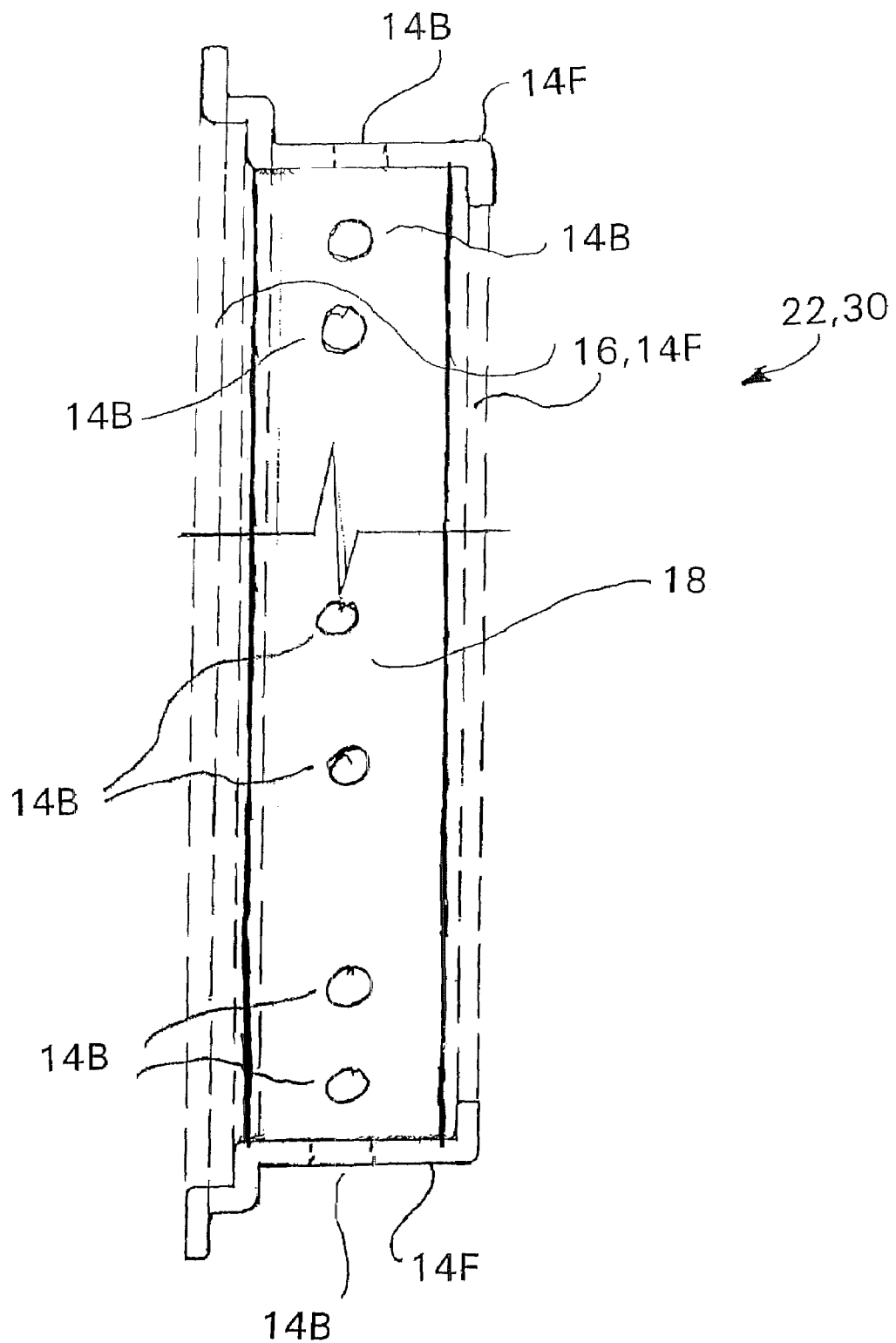
FIG. 3D is a cross section view of a structural component have a forming strip of the present invention.
Figure 3E:
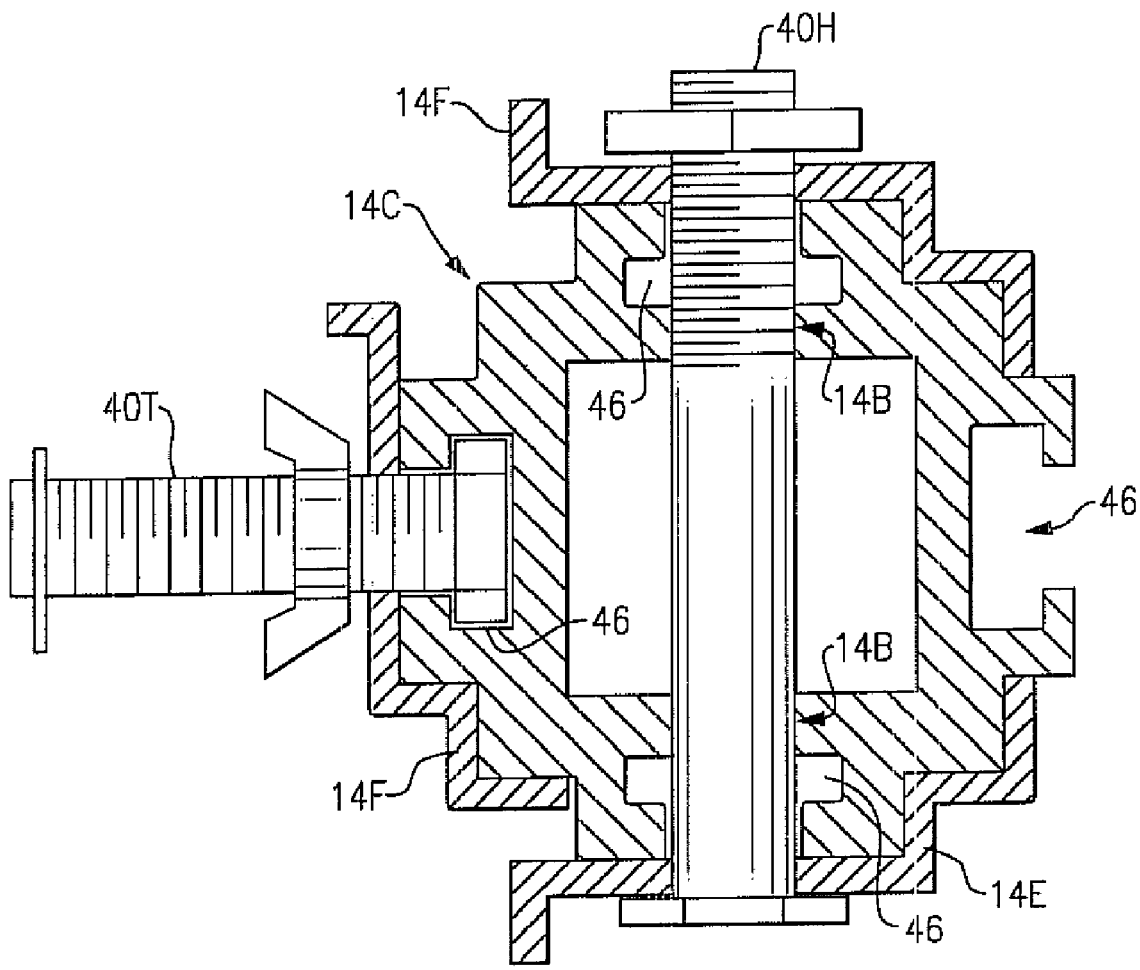
FIG. 3E is a cross section view of several forming strips mating with a chord and bolts fastening forming strips to the chord.

Cross sectional views of chords 14C, forming strips 14F and stubs 30 are illustrated and discussed with respect to FIGS. 3A-3E wherein FIG. 3A is a cross sectional view of a chord 14C, FIG. 3B is a cross sectional view of a chord 14C with a stub 34 inserted therein and with bolt holes 14B, FIG. 3C is a cross sectional view of a forming strip 14F, FIG. 3D is a cross sectional view of, for example, a purlin 22, a lattice truss 30 or a brace 32, and FIG. 3E is a cross sectional view of a chord 14 with multiple forming strips 14F mated thereto and secured with a hex-bolt 40H and a T-bolt 40T. The following descriptions will refer to all of FIGS. 3A-3E concurrently as certain aspects and elements of the present invention will be shown in one of FIGS. 3A-3E and not another solely for clarity of illustration, presentation and understanding and to avoid the complexity and crowding arising from the showing of all features in each individual figure. It must be understood, however, that the showing of one feature or aspect of the present invention in one of FIGS. 3A-3E and not another is not intended to be limiting and should not be taken to be limiting and that any given feature or aspect of the invention may otherwise appear in any or all of FIGS. 3A-3E and in any combination.

As illustrated in FIG. 3A, the main body 42 of a chord 14C is defined by four main walls 42W surrounding a generally square central opening, identified as bore 42B, forming a generally squares cross section, having four Interior main surfaces 42I and four exterior main surfaces 42E extending the length of the chord 14C, the Interior surfaces 42I and exterior surfaces 42E being spaced apart by the wall thickness 42T of main walls 42W.

The exterior main surface 42E of each main wall 42W further includes a T-slot structure 44 extending along the length of the chord 14C and centered on the exterior main surface 42E. Each T-slot structure 44 is formed by two parallel slot side walls 44S extending outwardly in parallel from the exterior main surface 44E and along the axis of the exterior main surface 44E and two slot face walls 44F extending inwardly towards each other from the tops of slot side walls 44S and parallel to exterior main surfaces 44E.

The structural elements of each T-slot structure 44 thereby form an interior T-slot 46 opening extending along the length of the T-slot structure 44, that is, the length of the chord 14C. Each T-slot 46 has a T-shaped cross section that includes a shaft T-slot 46S portion extending perpendicularly from the outer surface of the T-slot structure 44 and inwardly towards bore 42B of main body 42 and a cross T-slot 46C extending at right angles to either side of shaft T-slot 46S at the inner end of shaft T-slot 46S and terminating shaft R-slot 46C.

The dimensions and shape of a T-slot structure 44 and the interior dimensions and shape of a T-slot 46 are determined so that a T-slot 46 will accept either a conventional hex bolt 40H or a T-bolt 40T, with the head of the hex-bolt 40H or the head of the T-bolt 40R being accepted into and fitting within the cross T-slot 46C. The shape and dimensions of T-slot 46 are specifically designed for use with hex bolts 40H, which as well known and as indicated by phantom lines in, for example, FIG. 3E, has a rectangular head wherein the head is generally slightly longer than the width of cross T-slot 46C and approximately as wide as the width of shaft T-slot 46S. The shape and dimensions of the head of a T-bolt 40T are thereby such that the head of a T-bolt 40T may pass through shaft T-slot 46S and into cross T-slot 46C when the long axis of the rectangular T-bolt 40T head is aligned along the longitudinal axis T-slot 46. The T-bolt 40T may then be rotated about the axis of the shaft of the T-bolt 40T until the head of the T-bolt 40T is transverse to the longitudinal axis of the T-slot 46. At this point, the T-bolt 40T cannot be withdrawn from the T-slot 46 as the length of the T-bolt 40T head in this orientation is greater than the width of the shaft T-slot 46S. In addition, the T-bolt 40T can be rotated to form an interference fit with the walls of cross T-slot 46C, thereby preventing movement of the T-bolt 40T along the T-slot 46 or at any angle to T-slot 46. The T-bolt 40T can be removed only by rotating the T-bolt 40T until the long axis of the T-bolt 40T head is aligned with the longitudinal axis of the T-slot 46.

T-slots 46 may also accept standard hex-bolts 40H but the shape and dimensions of the head of a hex-bolt 40H will generally prevent the insertion or removal of the head of the hex-bolt 40H through shaft T-slot 46S at any point along the length of the T-slot 46, and will generally require that the hex-bolt 40H be inserted or removed at one end of the T-slot 46 and moved along the T-slot 46 to the desired location. It will also be recognized that the shape of the head of a hex-bolt 40H will generally not permit effective use of the rotating cam locking action, as with a T-bolt 40T, unless the head of the hex-bolt 40H is specially adapted for this purpose.

Further in this regard and as also illustrated in FIGS. 3A-3E and as has been discussed, chords 14C, forming strips 14F and stubs 14S include bolt holes 14B located along their lengths to allow the components 12 to be attached to one another by, for example, hex-bolts 40H. The arrangement of bolt holes 14B in a structural element 12E, such as a chord 14C, a forming strip 14F or a stub 14S, usually takes the form of a pair bolt holes 14B at or near each end of the structural element 12E, with the two bolt holes 14B being arranged in series along the structural element 12E and spaced a first standardized distance apart. Other single bolt holes 14B may also be spaced along the structural element 12E, and will typically be spaced a second standard distance apart where the second standard distance is typically larger than the first standard distance.

The bolt holes 14B in a chord 14C for T-bolts 40T are illustrated generally in FIGS. 3E and 3B, wherein a bolt hole 14B is shown as extending transversely through the width of the chord 14C. As indicated, the bolt hole 14B is comprised of the passage formed by the shaft T-slots 46T located on opposing sides of the chord 14C and two matching holes 14H formed in main walls 42W, which thereby connect the two shaft T-slot 46T through the main body 42 of the chord 14C to form the single bolt hole 14B passage. As indicated, the head 40HH of the hex-bolt 40H, and often a washer of some form, will thereby bear against the outer surface of the slot face walls 44F of one of the T-slot structures 44 while the hex nut, and again possibly a washer, will bear against the outer surface of the slot face walls 44F of the opposing T-slot structure 44.

As further illustrated in FIG. 3B, a stub 34 may be inserted into the central bore 42B of a chord 14C with bolt holes 14B in opposite faces of the stub 34 corresponding to and being aligned with corresponding passages on opposite sides of the chord 14C. As shown, the passage on each side of chord 14C is comprised of a bolt hole 14B in a main wall 42W of the chord 14C in alignment with the shaft T-slot 46S of the corresponding T-slot structure 44, thereby allowing a hex-bolt 40H to be secured through the chord 14C and stub 34. As described previously, stubs 34 thereby allow chords 14C to be connected lengthwise to yet other components 12, such as another chord 14C or a wheel assembly.

C. Mating of a Forming Strip 14F to a Chord 14C

Next considering the mating of a chord 14C with a forming strip 14F, such as a connection element 16, and as illustrated in particular in FIG. 3E and in FIGS. 3B and 3C considered jointly, it will be apparent that the cross section forms of a chord 14C and of a forming strip 14F result in a plurality of bearing surfaces to support compressive, tensional and torsional forces resulting from the assembly of components 12 into a structure 10.

First considering chords 14C, for example, each exterior main surface 44E of a chord 14C provides two chord bearing surfaces 48, indicated as main body bearing surfaces 48A and 48B, wherein each of main body bearing surfaces 48A and 48B is located between a exterior side of a slot side wall 44S and the outer edge of the adjacent exterior main surface 44E and extends the length of the exterior main surface 44E. The slot side walls 44S and slot face walls 44F of each T-slot structure 44 form side wall bearing surfaces 48C and 48D and face wall bearing surfaces 48E and 48F for each exterior main surface 44E. As indicated, side wall bearing surfaces 48C and 48D and face wall bearing surfaces 48E and 48F are formed by the exterior surfaces of slot side face surfaces 44S and slot outer face surfaces 44O.

Lastly with respect to chords 14C, it must be noted that the inner surfaces of each T-slot 46, that is, the inner faces of slot side walls 44S and slot face walls 44F, form further bolt bearing surfaces 48G and 48H to support the compressive forces resulting from tensional and torsional forces imposed through T-bolts 40T. In this regard, it must also be noted that the plane defined by the inner face of each cross T-slot 46C, that is, the face parallel and adjacent to the corresponding Interior main surface 42I of the main wall 42W of the chord 14C, is not co-planar with the corresponding exterior main surface 42E of the main wall 42W. Instead, the plane defined by the inner face of each cross T-slot 46C is offset inwardly towards the central axis of the chord 14C with respect to the exterior main surface 42E, thereby effectively being within the thickness of the main wall 42W. As may be seen from examination of FIGS. 3A-3E, not only are the planes of the inner face of each cross T-slot 46C and the corresponding exterior main surface 42E of the main wall 42W not co-planar, but the wall thickness through the diagonal shortest path between these planes, that is, between the adjacent corners terminating these planes, is maximized so that the geometry of these elements provides increased strength at a potential point of maximum stress.

Referring now to forming strips 14F as illustrated in cross sectional view in FIGS. 3C, 3D and 3E, each forming strip 14F is comprised of a single strip plate 50P having a standard width and a variable length that is typically greater than its width and that may range from the entire length of a purlin 22, for example, to the length necessary to form an attachment between, for example, a purlin 22 or truss 30 and a chord 14C. As illustrated in the cross sectional views of a forming strip 14F, the cross section of a forming strip 14F is comprised of a plurality of strip segments 50S running the length of the forming strip 14F and forming a succession of faces mating with corresponding faces formed by the cross section of a chord 14C.

As shown, each strip segment 50S in succession across the strip plate 50P is perpendicular to the preceding and succeeding strip segments 50S, so that successive strip segments 50S are joined by right angle corners, identified as strip corners 50C. Strip segments 50S may in turn be viewed as forming three primary regions, indicated in order across the strip segments 50S as comprising a corner region 50RC, a face region 50RF and an attachment region 50RA.

As illustrated, corner region 50RC is comprised of strip segments 50SA, 52SB and 52SC, thereby forming a "zig-zag" or "w shaped" structure mating with a corner formed by the main wall 42W of the face of the chord 14C with which the forming strip 14F is mating and an adjacent main wall 42W of that chord 14C. Corner region 50RC thereby forms bearing surfaces 52A, 52B and 52C that respectively mate with corresponding main body bearing surfaces 48A and 48A and a wall bearing surface 48C of the chord 14C.

Face region 50RF is formed of the single strip segment 50SF which mates against the two slot Outer face surfaces 44O of the T-slot structure 44 of the main wall 42W of the face of the chord 14C with which the forming strip 14F is mating. As may be seen, therefore, face region 50RF provides a bearing surface 52D/E that mates with face wall bearing surfaces 48E and 48F of the T-slot structure 44.

Finally, attachment region 50RA is comprised of strip segment 50SG, which extends directly outwards from the chord 14C along one side of the forming strip 14F and which does not bear against any surface of the chord 14C. Instead, attachment region 50RA provides a structural element for stiffening and reinforcing the forming strip 14F and as a possible attachment point or attachment reinforcement point for other structural elements that are permanently attached to the forming strip 14F. For example, attachment region 50RA may serve as the attachment point for cross forming strips 14F running between longitudinal forming strips 14F, for the attachment and bracing of various other reinforcing elements, such as the piping sections of a lattice, or for the attachment of decking plates or grids.

In this regard, FIG. 3D is an exemplary cross sectional view of a component 12 wherein various elements, such as reinforcing elements 18, are connected between two forming strips 14F which comprise the main structural elements of the component 12. Examples of such may include various forms of purlins 22 and lattice trusses 30. As shown therein, the reinforcing elements 18 are attached to a strip attachment face 52AF in the face region 50RF area of a forming strip 14F wherein strip attachment face 52AF is "outer" side of face region 50RF, that is, the side of face region 50RF that normally faces away from a chord 14C when the forming strip 14F is mated to the chord 14C as described above.

It will, therefore, be seen from FIGS. 3A-3E that one or more forming strips 14F or segments of forming strip 14F functioning as connection elements 16 can be concurrently mated to any or all of the four faces of a chord 14C or a segment of a chord 14C, thereby allowing great flexibility in designing and assembling components 12 into a structure 10. In the illustrative example shown in FIG. 3E, for example, three forming strip 14F sections are mated to a single section of a chord 14C wherein the forming strip 14F sections are, for example, connection elements 16 of other components 12. As shown, two of the forming strip 14F sections are mated in a mirror orientation to opposite sides of the chord 14C and are mechanically fixed to the chord 14C by at least one hex-bolt 40H extending through the chord 14C between the outer faces of their respective face regions 50RF. The third forming strip 14F is mated against a third face of the chord 14C, and is mechanically fixed to the chord 14C by a T-bolt 40T inserted into the corresponding T-slot 46 of that face of the chord 14C.

It will be appreciated from examination of FIG. 3E, however, that the limitation of the configuration illustrated in FIG. 3E is solely due to the chosen orientations of the forming strips 14F with the faces of the chord 14C and that up to four forming strips 14F functioning as, for example, connection elements 16, can be accommodated. For example, it may be seen in FIG. 3E that the limitation of the configuration to three forming strips 14F arises solely because the corner regions 50RC of the two mirror oriented forming strips 14F bear against the same face of the chord 14C, so that if an attempt were made to mate a fourth forming strip 14F with the unoccupied face of the chord 14C the corner region 50RC of one or the other of the two already present forming strips 14F would mechanically interfere with the corner region 50RC of the fourth forming strip 14F. It will also be apparent from FIG. 3E, however, that if the orientation of the forming strip 14F on the side on which the hex-bolt 40H nut is located were reversed, that is, if the forming strip 14F were rotated about the hex-bolt 40H so that its corner region 50RC occupied the presently unoccupied corner of the chord 14C, a fourth forming strip 14F could be accommodated. Stated another way, if the forming strips 14F mating with a chord 14C are oriented with respect to the faces of the chord 14C such that each corner of the chord 14C were occupied by a corresponding one of the corner regions 50RC of the forming strips 14F, then the maximum number of forming strips 14F, that is, four forming strips 14F, can be mated against the four faces of the chord 14C. It will be recognized, of course, that any lesser number of forming strips 14F can also be mated to a chord 14C when the forming strips 14F are oriented with respect to the faces of the chord 14C such that each corner of the chord 14C is occupied by a corresponding one of the corner regions 50RC of the forming strips 14F.

Next considering the interaction of the bearing surfaces of the forming strips 14F and the chords 14C, and referring in particular to FIG. 3E and FIGS. 3B and 3C jointly, it will be apparent that the design and cross section configuration of a forming strip 14F and a chord 14C are such that the two elements will mate along a plurality of bearing surfaces 48A-48H and corresponding forming strip bearing surfaces 52A-52F. It will also be noted that the mating bearing surfaces are oriented along either of two mutually perpendicular axis wherein, for each face of the chord 14C, one axis is perpendicular to the face of the chord 14C and the second axis is parallel to the face of the chord 14C.

As a consequence, a forming strip 14F and a chord 14C provide a large mutual bearing surface which permits a forming strip 14F and a chord 14C to securely carry corresponding large compression and tension forces. In addition, the distribution of the bearing surfaces along two mutually perpendicular axis also greatly increases the amount of torsional or rotational forces that the forming strip 14F and chord 14C are able to resist and support.

In this regard, it will also be rioted that in addition to preventing lateral movement between, for example, a chord 14C and a segment of forming strip 14F functioning as a connection element 16, that is, a movement or slip of the forming strip 14F along the chord 14C, T-bolts 40T and hex-bolts 40H exert compressive forces between a chord 14C and a forming strip 14F, thereby resisting tension forces between the chord 14C and forming strip 14F. That is, and as may be seen from FIG. 3A, a hex-bolt 40H will exert a compressive force between the outer face of the face region 50RF of a forming strip 14F bearing against one face of the chord 14C and either the outer face of the face region 50RF of a forming strip 14F bearing against the opposite face of the chord 14C or the outer face of the T-slot structure 44T of the opposite face of the chord 14C. In the case of a T-bolt 40T, the compressive force will be applied between the outer face of the face region 50RF of a forming strip 14F bearing against one face of the chord 14C and the inward facing surfaces of the slot face walls 44F of the T-slot structure 44T of the same face of the chord 14C. It should also be noted that the resistance to lateral movement of the components 12 in the case of a hex-bolt 40H fastening is provided by mechanical interference between the shaft of the hex-bolt 40H and the walls of the bolt holes 14B. In the instance of a fastening by a T-bolt 40T, the resistance to lateral movement along the chord 14C is friction between the mating bearing surfaces while the resistance to lateral sidewise movement is by mechanical interference between the shaft of the T-bolt 40T and the longitudinal sides of T-slot 46.

Lastly considering mechanical connections or attachments between forming strips 14F and chords 14C, and as discussed herein above, a forming strip 14F will typically include one or more bolt holes 14B to allow a forming strip 14F, such as a segments of forming strips 14F employed as connection elements 16 on the ends of other components 12, to be secured to, for example, a chord 14C or segment of a chord 14 by means of T-bolts 40T or hex-bolts 40H. The number an spacing of such bolt holes 14B will depend on the length and intended use of the forming strip 14F or segment of forming strip 14F, by will correspond to the locations, spacings and dimensions of bolt holes 14B in the mating components 12, as discussed herein above.

As shown in FIGS. 3C, 3D and 3E, a bolt hole 14B or bolt holes 14B will be located in the face region 50RF area of a forming strip 14F, and will be aligned with the corresponding shaft T-slot 46S and any corresponding bolt holes 14B through the two facing main walls 42W of the chord 14. This arrangement allows the forming strip 14F to be secured to the chord 14C by means of one or more T-bolts 40T secured into the T-slot 46 or by means of a T-bolt 40T in combination with a Hex-bolt 40H extending through the forming strip 14F and the chord 14C, as discussed above, or by means of one or more hex-bolts 40H.

In this regard, it will be apparent that the number of bolts 40 in a connection or mating between a forming strip 14F and a chord 14C will depend upon the location of the connection along the chord 14C. As discussed previously, for example, a chord 14C or forming strip 14F will typically have a pair of relatively closely spaced bolt holes 14B at the ends of the chord 14C or forming strip 14F and a number of single bolt holes 14B spaced apart by a fixed interval along the length of the chord 14C or forming strip 14F. In presently preferred implementations of the present invention, single bolt hole 14B connections along the length of a chord 14C or forming strip 14F are preferably accomplished by means of single T-bolts 40T while connections by means of the paired bolt holes 14B at the ends of the elements are preferably accomplished by a single T-bolt 40T and a single hex-bolt 40H or by two T-bolts 40T, although these connections may be varied according to circumstances.

D. Extreme Environmental Condition Resistant (EECR) Structures, Basic Structural Elements As described above the present invention is directed to a method and apparatus for modular construction of extreme environmental condition resistant (EECR) structure, such as houses, and, in particular, a system of common modular components for constructing buildings such as houses having high resistance to extreme environmental conditions, such as hurricanes, tornadoes, fires and so on. The following will now describe the adaptations and modifications of the above described components and assemblies of the present invention to the construction of EECR structures.

It will be apparent from the above descriptions of the generalized components and assembly methods for the construction of structures that components 12 of the present invention include a limited number of different types of structural elements 12E having shapes and functions as defined according to the present invention and that this "library" of shapes allows the construction of a wide range of structures 10, including, as described in the following, extreme environmental condition resistant (EECR) structures 10E such as houses having improved resistance to extreme environmental conditions. As in the generalized components and assembly methods described above, the basic array of components 12 for EECR structures 10E will generally include main elements 14 and connection elements 16 of various forms have common contours or shapes and dimensions and wherein the basic structural members of a component 12 will again generally include the structural members referred to as chords 14C and forming strips 14F. Connection elements 16 in turn again comprise the means by which components 12 are connected together to form an EECR structure 10E, and are typically formed of or incorporate forming strips 14F or stubs 16S.

To briefly summarize the above described components and assembly methods of the present invention as applied to the generalized construction of structures, which will include EECR structures 10E, a chord 14C as shown in FIG. 2A is an elongated member having a variable length and the chord 14C cross section illustrated in FIG. 2A while a forming strip 14F is an elongated member of variable length having the forming strip 16FS cross section illustrated in FIG. 2B, although components 12 may include yet other standard structural shapes where such other elements would be more suitable for the intended purpose.

As also described, a set or library of components 12 will typically include straight chords 20 of various lengths, as shown in FIG. 2A, wherein a straight cord 20 has a single main element 14, which is a single chord 14C that is usually positioned vertically and that has a number of bolt holes 14B extending through the diameter of the chord 14C near the ends to engage with one or more connecting elements 16. A straight chord 20 will also typically include bolt holes 14B located along the length of the chord 14C at standard distances or intervals to enable connections to other components 12.

Other commonly used components 12 may also include various forms of purlins 22 wherein a purlin 22 is a generally beam-like structure. In this regard, it should be noted that the term "purlin" once meant as a specific type of horizontal structural member, but that the term "purlin" has, in more recent common usage, assumed a general meaning as any type of horizontal structural member and could be extended to include vertically oriented structural members.

As was described with reference to FIGS. 2C, 2D, 2E and 2F, the various types of purlins 22 typically include single purlins 22A, as shown in FIG. 2C, which are each comprised of a single horizontally positioned main element 14 comprised of a single chord 14C of standard length with a connection element 16 located at each end of the chord 14C. In a typical single purlin 22A, the connection elements 16 are comprised of sections of forming strips 14F attached transversely to the ends of the single purlin 22A, and the main element 14 may in certain alternate embodiments be comprised of a forming strip 14F of the desired length rather than of a chord 14C.

Standard purlins 22B of various lengths, as was shown in FIG. 2D, are comprised of upper and lower horizontal main elements 14 with generally vertical reinforcing elements 18 running between the horizontal main elements 14 and a connection element 16 at each end of each of the main elements 14. In a typical implementation of a standard purlin 22B, the horizontal main elements 14 may be comprised of forming strips 14F or chords 14C, the reinforcing elements 18 are typically formed of piping of an appropriate diameter and wall thickness, and the connection elements 16 are each comprised of a vertical section of forming strip 14F extending between the upper and lower horizontal main elements 14.

Platform deck purlins 22C, in turn, as shown in FIG. 2E, are intended for use as the supporting structures for horizontal platforms or decks, such as may be used to form work platforms, stair landings, exterior deck floors, floors between levels of a structure 10 or EECR structure 10E, a runway or slanted ramp between level platforms, and so on. A platform deck purlin 22C is thereby comprised of a parallel pair of horizontally positioned and horizontally spaced apart main elements 14 that are typically comprised of chords 14C but that may be comprised of forming strips 14F, and that are connected by reinforcing elements 18 formed of forming strips 14F extending horizontally between and a right angles to the main elements 14. A connection element 16 comprised of a forming strip 14F extending between and attached to the main elements 14 is located at each end of the platform deck purlin 22C, so that the platform deck purlins 22C may be connected to, for example, horizontally positioned standard purlins 22B. Decking or platform components, such as various types of deck or interior floor materials or under-flooring and top finish flooring of all types, may then be laid upon or attached to the top surface of one or more adjacent platform deck purlins 22C to form, for example, a balcony or deck floor or a floor between levels of a structure 10 or EECR structure 10E.

It will be appreciated that yet others of the above described components 12 may be used as necessary to construct a house-like structure 10 or EECR structure 10E, including, for example, roofing, truss and bracing components 12 and components 12 forming, for example, the joins between roof and wall elements or floor and wall elements, and so on.

Figure 4A:
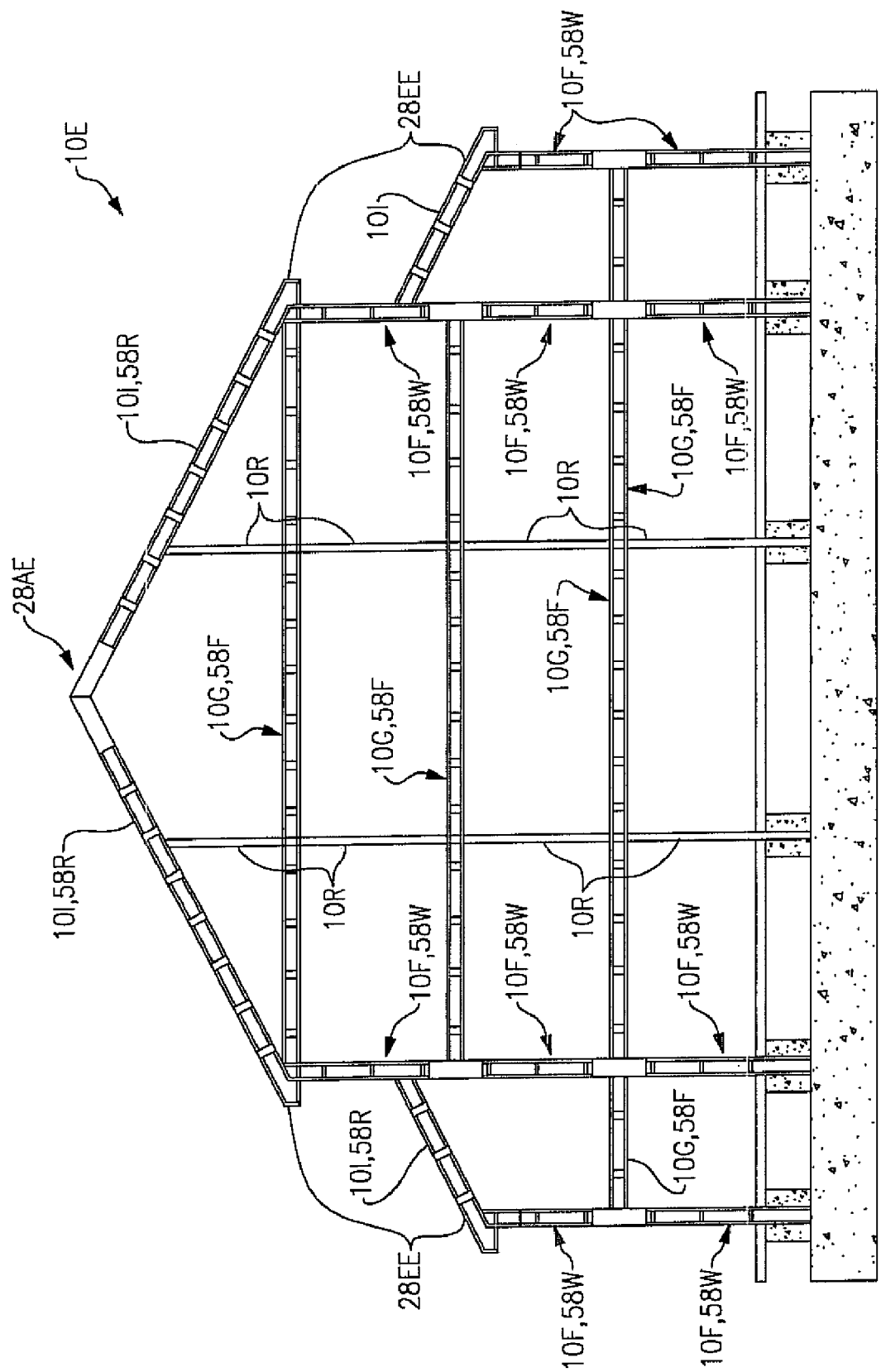
FIGS. 4A and 4B are diagrammatic illustrations of the main structural components and assembly of an extreme environmental condition resistant (EECR) structure generally similar to the structure 10 illustrated in FIGS. 1A and 1B.
Figure 4B:
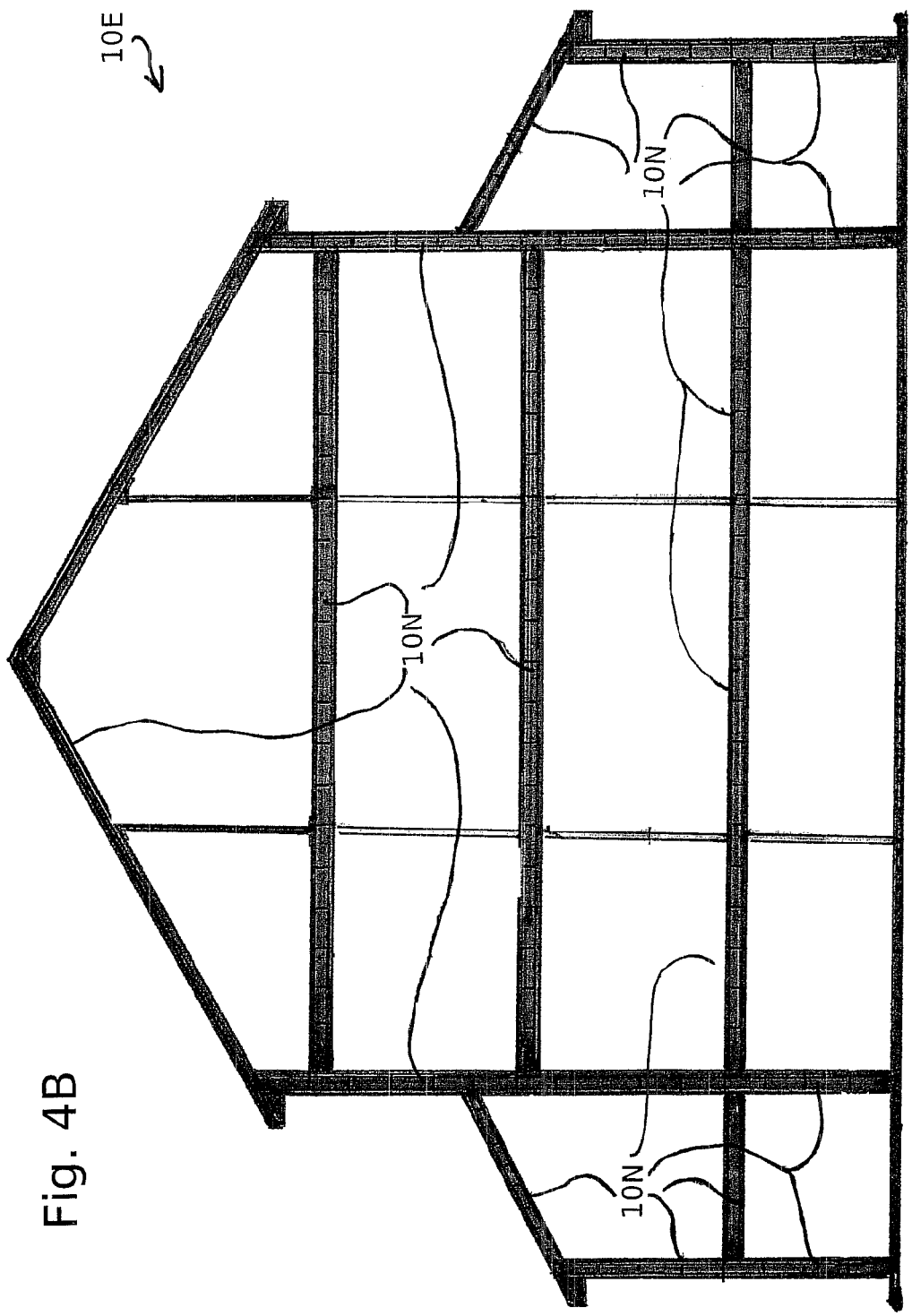

Therefore next considering an exemplary EECR structure 10E, such as a hurricane resistant house, FIGS. 4A and 4B are diagrammatic illustrations of the main structural components and assembly of an extreme environmental condition resistant (EECR) structure 10E.

Referring first to FIG. 4A, it may be seen that an EECR structure 10E corresponds generally to a structure 10 as illustrated in FIG. 1B except that, as may be seen in FIG. 4A, the structural components of an EECR structure 10E are of increased strength, such as doubled chords 14C as opposed to single chords 14C, and the presence of additional reinforcing elements, such as added reinforcing pillars 10R located between main wall assemblies 10F.

FIG. 4B in turn is an additional cross sectional view of an EECR structure 10E comparable to that illustrated in FIG. 4A, but illustrating the support/insulation material 10N, which is injected into all wall and floor spaces for insulation, soundproofing, and structural support, and exterior and interior wall sheathing 10O and 10P that further provides structural reinforcement to the EECR structure 10E. In this regard, it should be noted that the insulation 10N is, in a presently preferred embodiment, a foam that is preferably continuous across adjacently connecting walls, floors and roof structures, thereby providing additional support to the overall structure. In addition, the structural elements of an EECR structure 10E will typically further include an exterior wall sheathing 10O which may be comprised, for example, of plywood bolted or adhered to the wall framing elements, and an interior wall sheathing 10P which may be comprised, for example, of wallboard attached to the wall framing by, for example, self-tapping screws or adhesives, and so on, both of which provide further structural reinforcement to the structure.

Considering the adaptations, modifications and changes to the structural elements 12E of non-extreme environment structures 10 to form the EECR structural elements 12EE of an EECR structure 10E, it will be noted that, as shown in FIGS. 4A and 4B, the primary EECR structural elements 12EE include double chord beams 54B and double chord connectors 54C. As will be described below, these elements are essentially the primary structural elements of an EECR structure 10E and respectively form the primary structural beam elements of the walls, floors, ceilings and roofs and the elements for joining the double chord beams 54B to one another and to other structural elements.

Figure 5B:
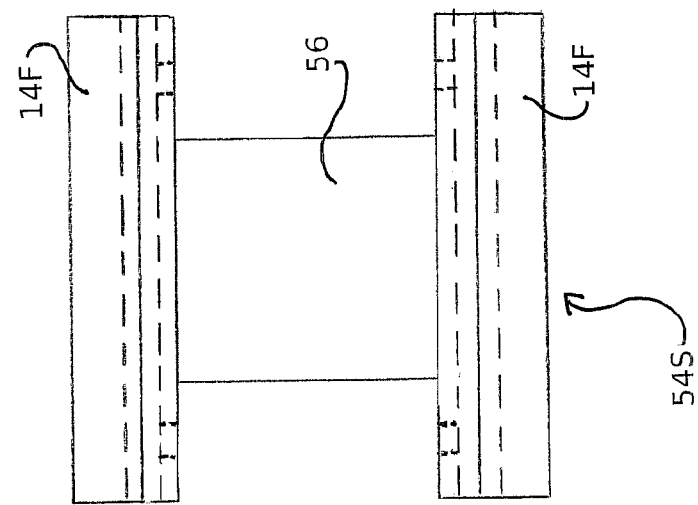
FIGS. 5A and 5B are respectively diagrammatic representations of an EECR roof ridge section and an EECR double eave section.
Figure 5A:
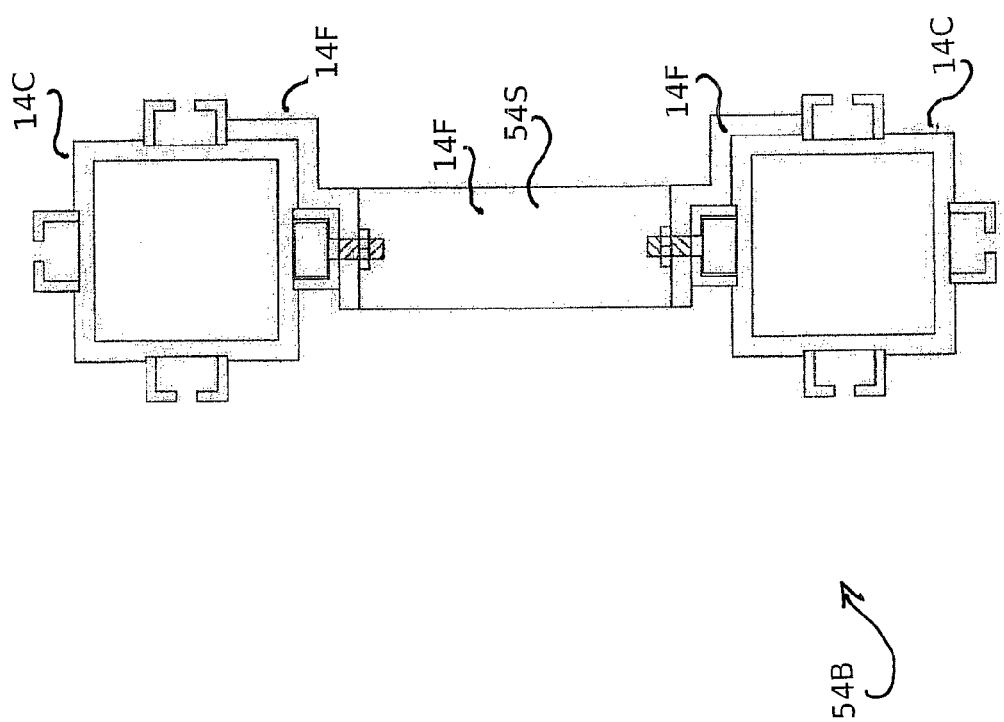

Therefore first considering the structure and construction of double chord beams 54B, FIGS. 5A and 5B are respectively an end cross sectional view of a double chord beam 54B and a spacer 54S for use in constructing a typical embodiment of a double chord beam 54B. As shown therein, a double chord beam 54B is comprised of a pair of parallel chords 14C spaced apart by one or more double ended beam spacers 54S, and typically by a plurality of double ended beam spacers 54S. In a presently preferred embodiment, each double ended beam spacers 54S may be comprised of a spacer element 56 extending between the chords 14C of the double chord beam 54B and attached to each chord 14C by a corresponding forming strip 14F. As shown, each forming strip 14F is affixed to the end of the spacer element 56 to be perpendicular to the axis of the spacer element 56 and parallel to the axis of the mating chord 14C and thereby mates with the corresponding chord 14C of the double chord beam 54B in the manner described in Section C herein above. It should also be noted that spacer elements 56 may alternately be comprised, for example, of reinforcements 18R arranged between the chords 14C or any other form of structural connecting members, such as flat plates, tubular members, and so on, and may be permanently affixed to the chords 14C of the double chord beam 54B, such as by welding, to form a unitary permanent structural element.

Next considering double chord connectors 54C, as illustrated in FIG. 4A double chord connectors 54C are employed, for example, to join double chord beams 54B at the intersections between floor and wall beams or between floor and floor or wall and wall beams. It will be noted that, as illustrated in FIG. 4A, certain EECR double chord connectors 54C, such as those joining three double chord beams 54B as in the instance of the intersection a single double chord beam 54B floor beam and two double chord beam 54B wall beams at an outside wall, may include mating elements for three rather than four double chord beams 54B.

Figure 5C:
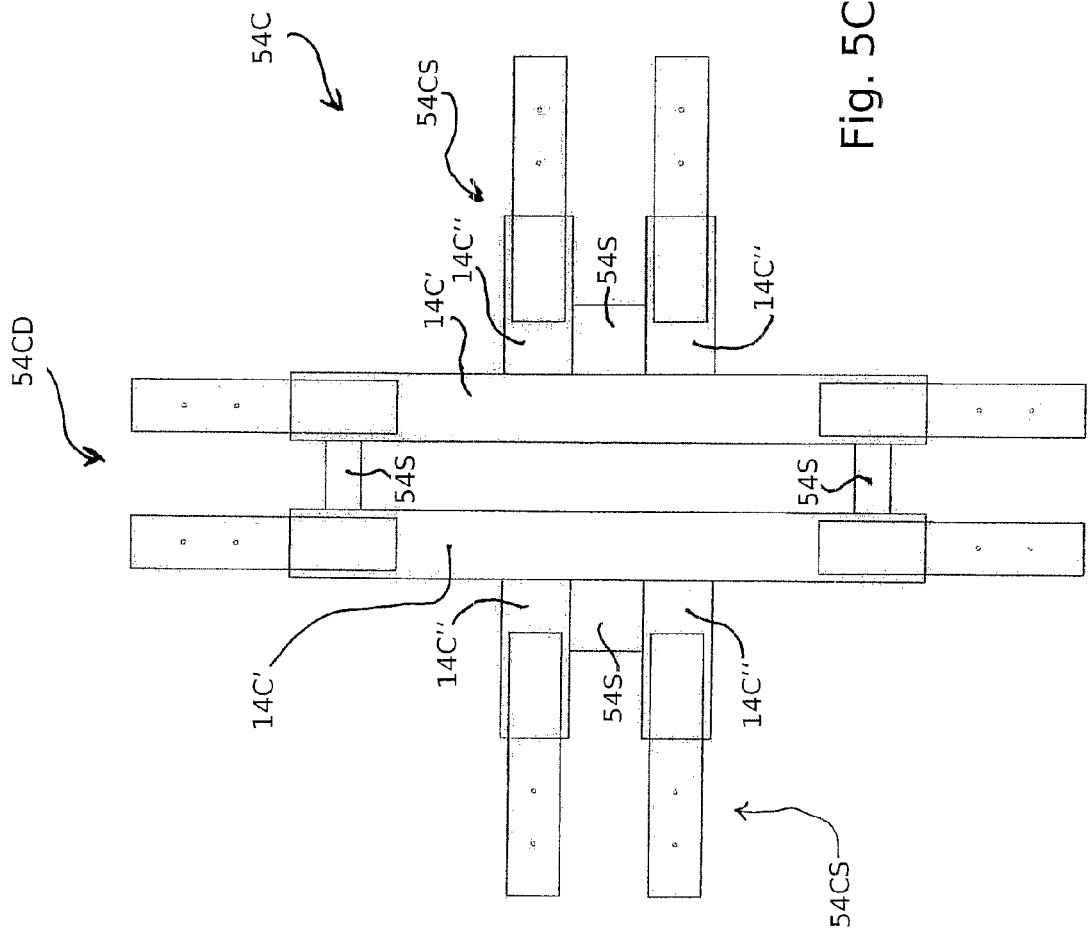
FIG. 5C is a diagrammatic illustration of an EECR double beam connector.

FIG. 5C is a diagrammatic illustration of a single plane, four way EECR double chord connector 54C for four double chord beams 54B arranged in a cruciform configuration in one plane, such as formed by the joining between a vertical upper double chord beam 54B, a vertical lower double chord beam 54B and two opposingly extending double chord beams 54B. As shown therein, a single plane, four way EECR double chord connector 54C is comprised of a double ended, double beam connector 54CD comprised of a pair of parallel chords 14C' spaced apart by a two or more spacers 54S wherein spacers 54S may, for example, be comprised of a forming strip 14F extending between and attached to the chords 14C' by forming strips 14F, reinforcements 18R arranged between the chords 14C' or any other form of structural connecting members, such as flat plates attached to the chords 14C'.

An EECR double chord connector 54C further includes at least one single ended, double beam connector 54CS comprised of a pair of parallel chords 14C" connected at one end to one of the chords 14C' of double ended, double beam connector 54CD and spaced apart by at least one spacer 54S. The configuration illustrated in FIG. 5C, for example, includes a second single ended, double beam connector 54CS connected to and at right angles to the axis of the other of the pair of chords 14C' of the double ended, double beam connector 54CD. Again, spacers 54S of the single ended, double beam connectors 54CB may be comprised, for example, of a forming strip 14F extending between and attached to the chords 14C', reinforcements 18R arranged between the chords 14C' or any other form of structural connecting members.

As indicated generally in FIG. 5C and as described in Sections B and C herein above, structural elements such as double chord beams 54B used as floor or wall beams or other structural elements of the present invention may be attached to an EECR double chord connector 54C, or to each other through an EECR double chord connector 54C, by means of stubs 14S inserted into the chords 14C' and 14C' of the EECR double chord connector 54C, as described herein above, or by forming strips 14F bolted to the chords 14C' or 14C" of the EECR double chord connector 54C, as also described herein above.

It should also be recognized that an EECR double chord connector 54C as illustrated in FIG. 5C can be readily modified or extended into various configurations, including three dimensional configurations. For example, the double chord connector 54C illustrated in FIG. 5C may be adapted to the junction of floor and wall beams at the outer wall of an EECR structure 10E, where there is a double floor beam 54A only one one side of the junction, merely by eliminating one of the horizontally extending single ended, double beam connector 54CS. In a further example, a double chord connector 54C may be adapted for use in the interior of a structure at a juncture where double floor beams 54A extending at right angles to each other intersect at a common junction with upward and downward extending double wall or support beams 54A. This adaptation would be accomplished by the addition of one or more single ended, double beam connectors 54CS to the chords 14C' and 14C" of the double chord connector 54C, but extending at right angles to the plane of the double ended, double beam connector 54CD and single ended, double beam connectors 54CS of the embodiment of a double beam connector 54C as illustrated in FIG. 5C. The adaptation of the basic embodiment of a double chord connector 54C illustrated in FIG. 5C to yet further configurations will be apparent to those of ordinary skill in the arts.

Lastly, it should also be recognized that rather than being constructed as a permanent assembly of elements, such as welded components, an EECR double chord connector 54C may also be constructed by the assembly of individual components as described in Sections A, B and C herein above.

Figure 5D:
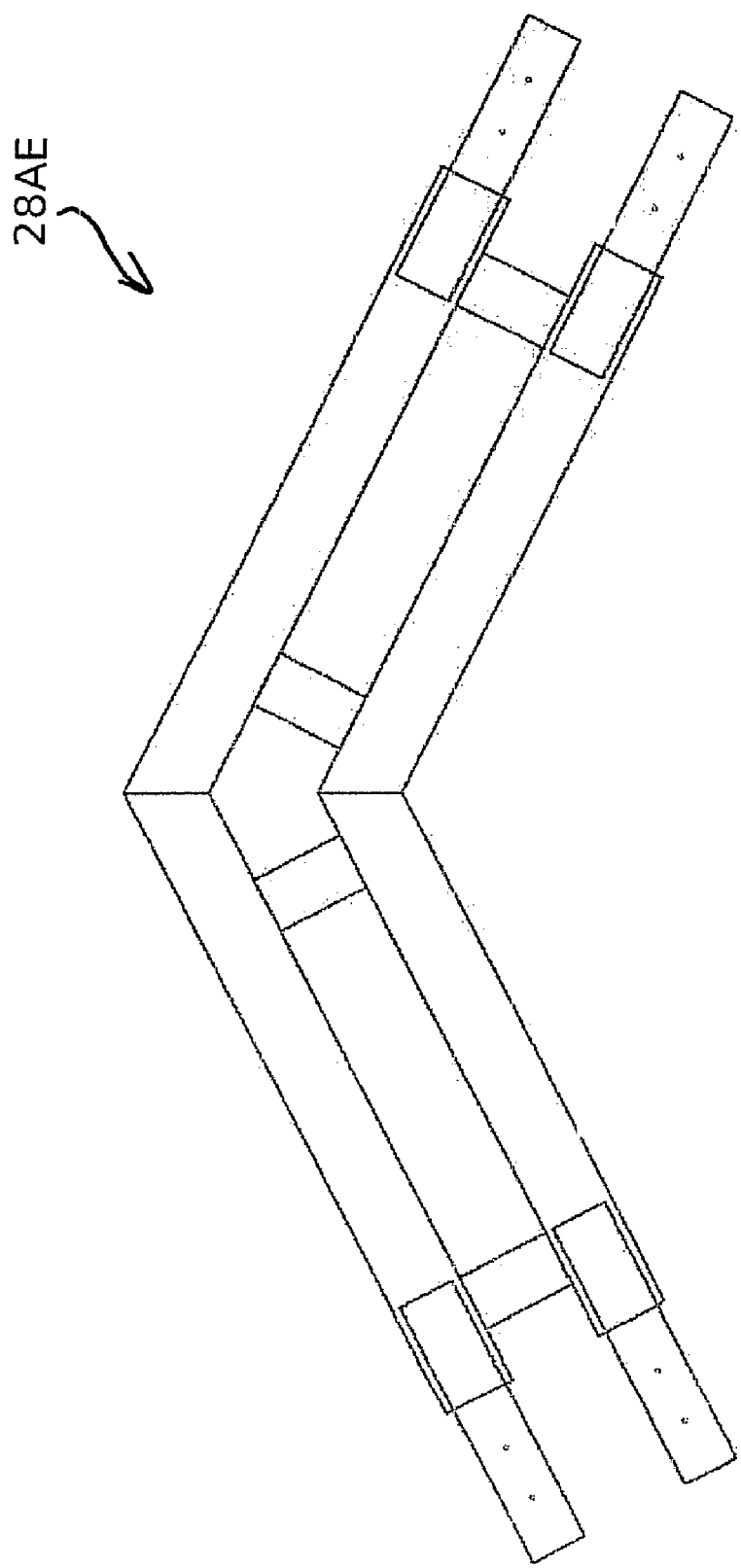
FIG. 5D is a diagrammatic illustration of an EECR ridge section.
Figure 5E:
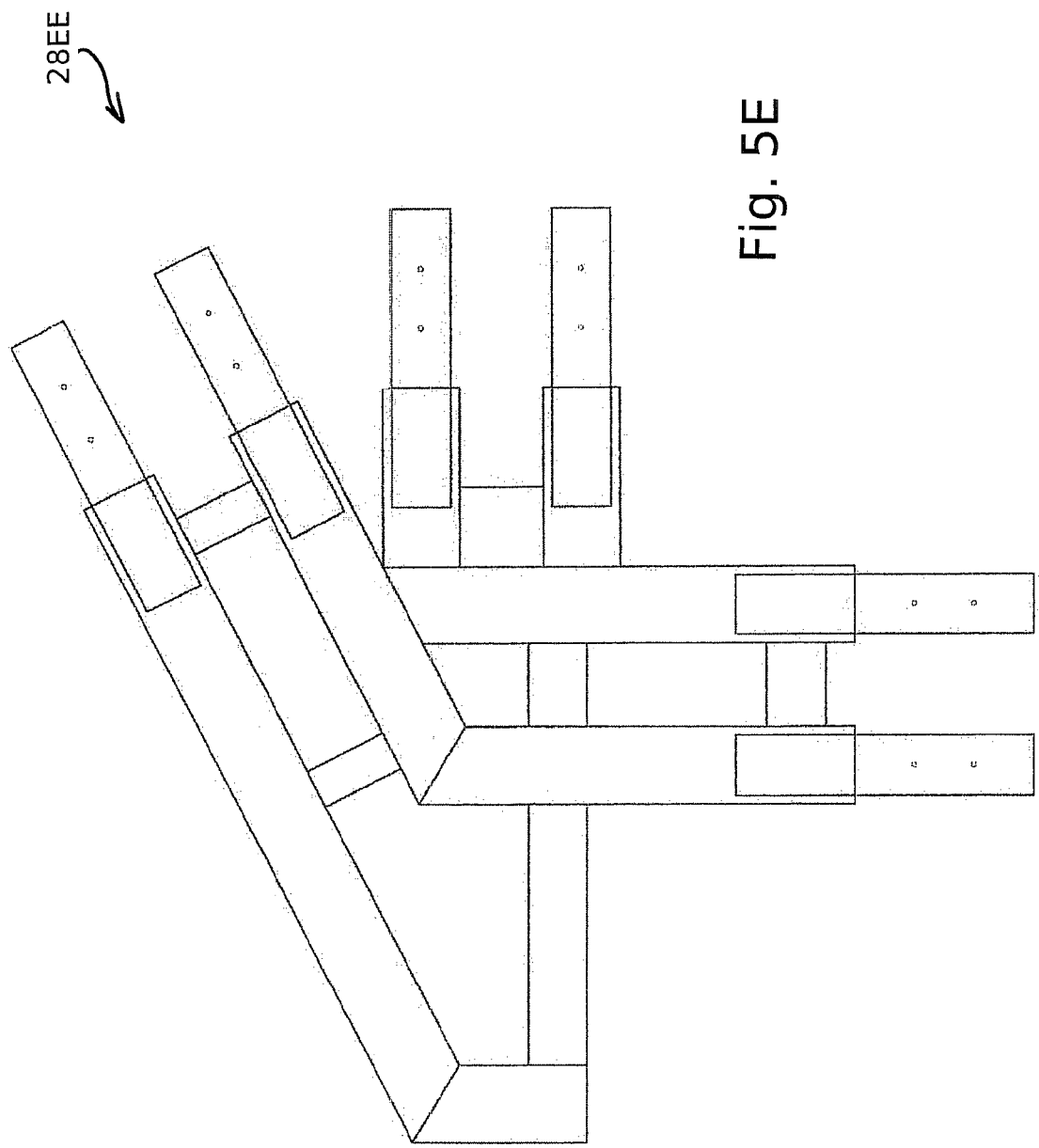
FIG. 5E is a diagrammatic illustration of an EECR eaves section.
Figure 5F:
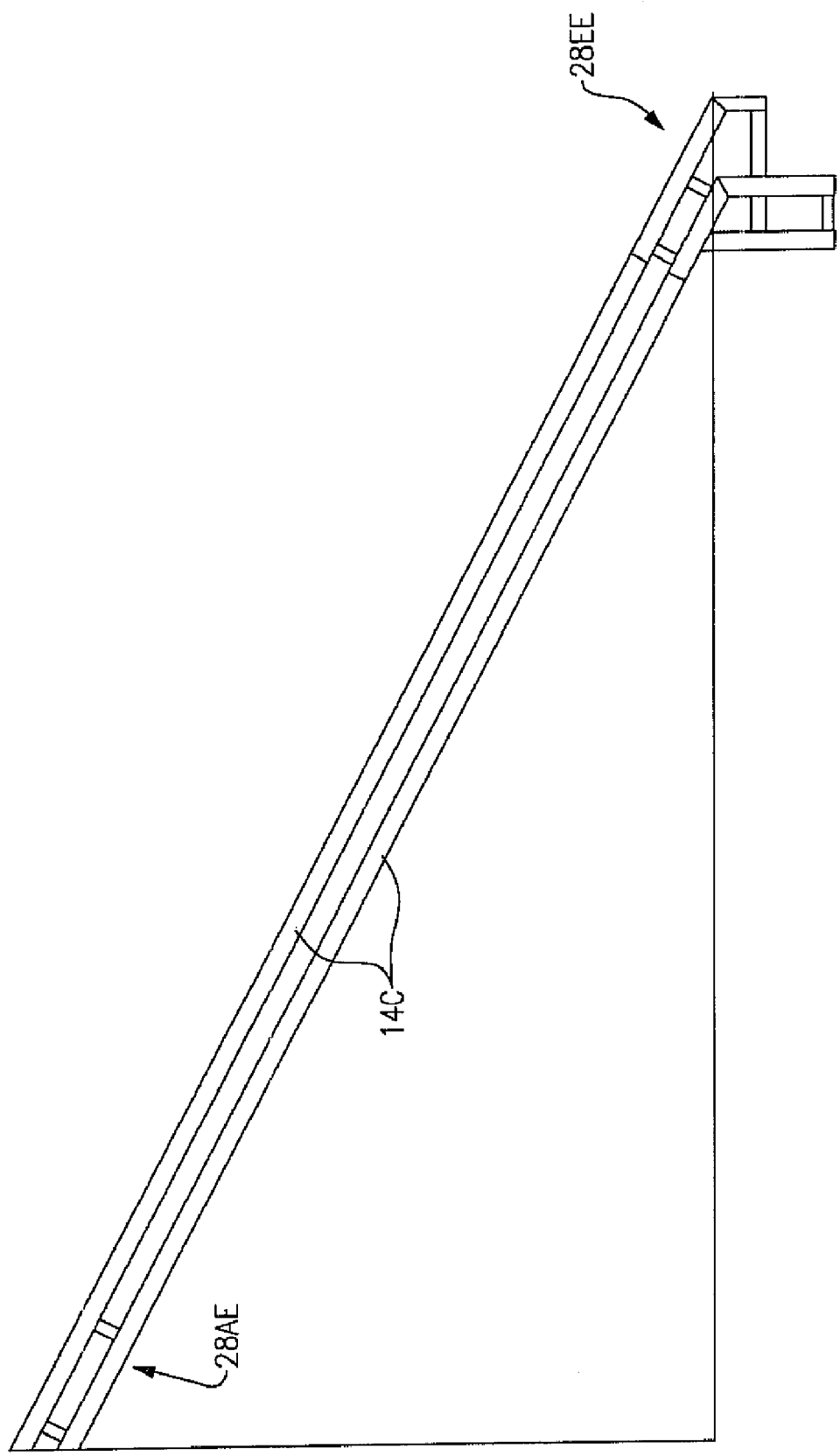
FIG. 5F is a diagrammatic illustration of an EECR section.

It will also be apparent that others of the elements 12E described in Sections A, B and C herein above may likewise be adapted for use with EECR double chord beams 54A and double chord connectors 54C. Examples of such include ridge chords 28A of FIG. 2G and double eave sections 28E of FIG. 2H which have been modified and adapted as shown in FIGS. 5D and 5E to form EECR roof ridge sections 28AE and EECR double eave sections 28EE to mate with double chord beams 54A and double chord connectors 54C. In this regard, it must also be noted that structural elements 12E adapted for use with double chord beams 54A and double chord connectors 54C may also be employed with single chord 14C beams as illustrated in FIG. 5E wherein a roof ridge section 28AE and a double eave section 28EE are connected by two separate single chore 14C beams.

E. Extreme Environmental Condition Resistant (EECR) Structures, Exterior Main Structural Assemblies and Exterior/Interior Sheathing Referring again to FIGS. 4A and 4B, it is shown therein that the structural elements and assemblies of an EECR structure 10E, like that of a structure 10, will typically include provision for both inner and outer sheathing of the walls and often the roof and floor assemblies, space within the wall and roof elements and often within the floor assemblies for insulation, and space within the walls and often the roof and floor assemblies for piping, such as plumbing or gas lines, and wiring.

In addition, certain primary structural elements of an EECR structure 10E such as an exterior wall assembly 10F, a floor/ceiling assembly 10G or a roof assembly 10I and possible certain other interior structural elements, such as certain interior walls 10R, are constructed in a form providing additional structural strength and integrity and additional environmental protection to the interior spaces of the structure. As will be described in the following, such structural elements of an EECR structure 10E are based upon main structural assemblies 58, which are respectively designated in FIGS. 4A and 4B as modular wall assemblies 58W, modular floor/ceiling assemblies 58F and modular roof assemblies 58.

Figure 6A:
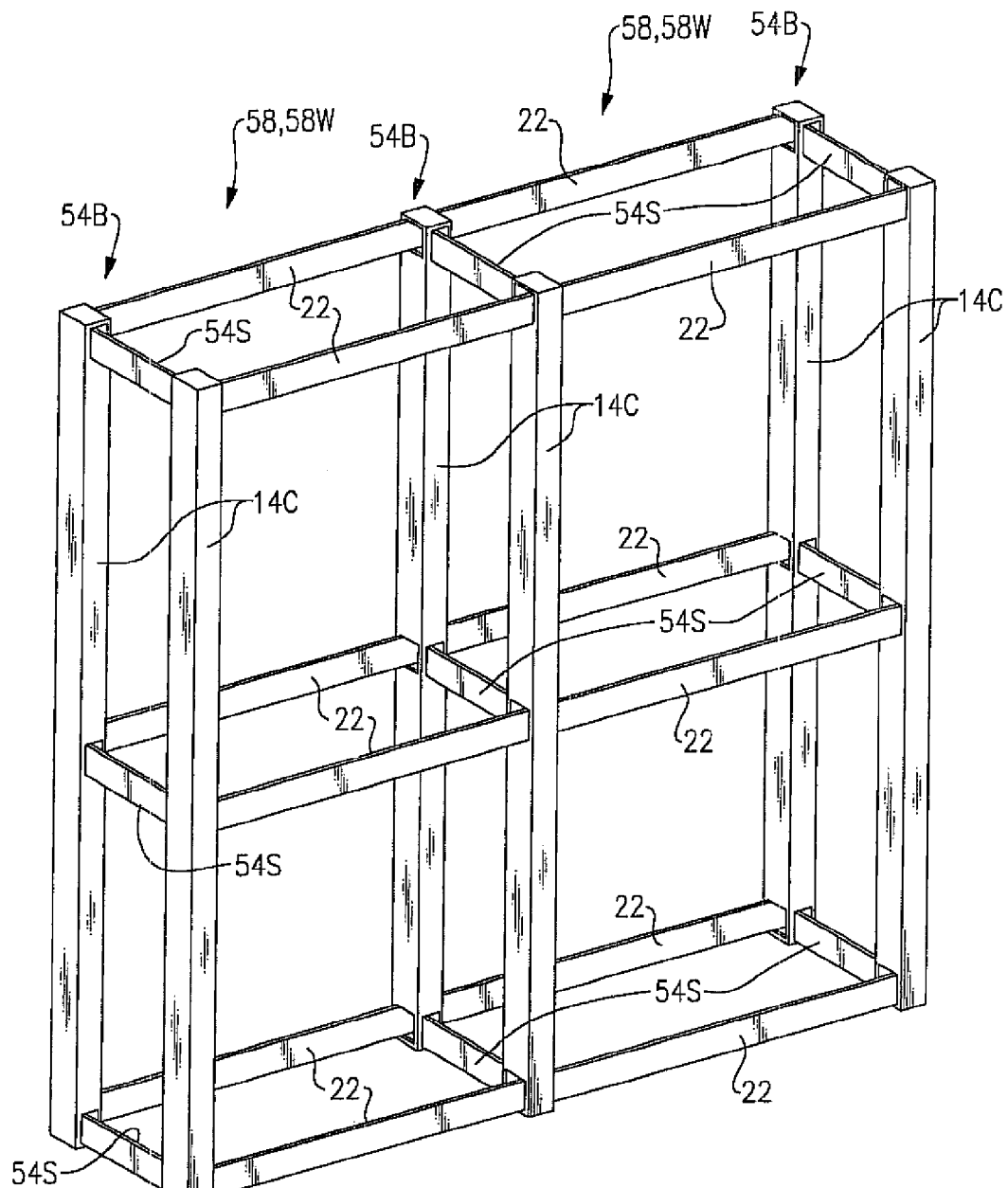
FIG. 6A is an isometric diagrammatic illustration of a modular structural assembly comprising a modular wall assembly.
Figure 6B:
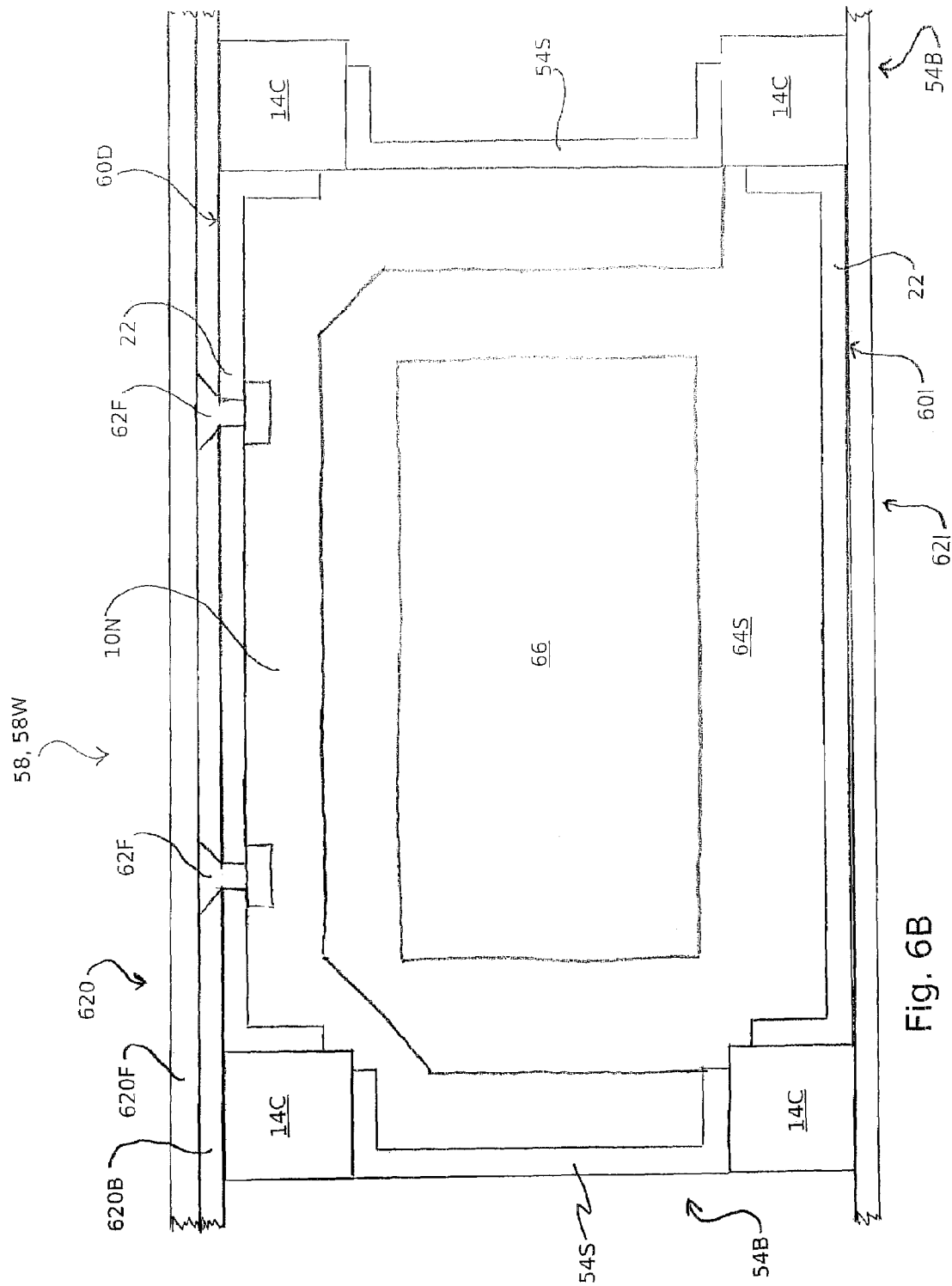
FIG. 6B is a diagrammatic cross section view of the modular structural assembly comprising a modular wall assembly of FIG. 6A.

Referring to FIGS. 6A and 6B, FIG. 6A is a diagrammatic isometric view of an EECR modular structural assembly 58 comprising an exterior modular wall assembly 58W and FIG. 6B is a cross section view of the exterior modular wall assembly 58W. It must be recognized that the structural components shown in FIGS. 6A and 6B, such as modular structural assembly 58, double chord beams 54B, spacers 54S, purlins 22 and other elements such as bolts or other fasteners, are represented therein in simplified, diagrammatic form to provide a simpler and clearer representation of the features to be discussed in the following descriptions. Detailed illustrations of these elements are, however, presented in the preceding figure and descriptions and reference should be made to the preceding figures and descriptions as necessary.

As illustrated in FIGS. 6A and 6B for the exemplary case of an EECR modular structural assembly 58 comprising a modular wall assembly 58W, an EECR modular structural assembly 58 is based upon a double chord beam 54B which is in turn, as described above, comprised of a pair of parallel chords 14C spaced apart by beam spacers 54S. In the case of a modular wall assembly 58W, for example, the double chord beams 54B of an EECR modular assembly 58 are arranged so that the parallel chords 14C, of the EECR modular structural assembly 58 are parallel to the plane of the wall and the spacers 54S connecting the parallel chords 14C are perpendicular to the plane of the wall. The two chords 14C of an EECR modular modular structural 58 thereby form perpendicular inner and outer face beams 58IF and 58OF located, respectively, on the inner and outer faces of the wall, and are spaced apart by horizontally extending interior wall spacers 58S formed of the spacers 54S. Modular floor/ceiling assemblies 58F and modular roof assemblies 58R are constructed in generally the same manner, with appropriate differences in the orientations of the chords 14C and spacers 54S, and the thickness of a wall, or of the ceiling, floor or roof, is therefore determined by the length of spacers 58S as well as the cross section dimensions of the chords 14C.

Again referring to FIGS. 6A and 6B, and as illustrated, a modular wall assembly 58W is comprised of at least a pair of double chord beams 54B connected by purlins 22 wherein the purlins 22 extend between the inner face beams 58IF or between the outer face beams 58OF and define the inner and outer surfaces 60I and 60O of the wall 10F. As also shown, the purlins may be located at the top and bottom of a modular wall assembly 58W, that is, at the intersection of the plane of the wall with, for example, the ceiling and floor assemblies, and in equivalent locations in modular floor/ceiling and roof assemblies 58F and 58R. It should also be noted that additional purlins 22 may be located at any point along the length or height of the chords 14C of a EECR modular structural assembly 58, for example to provide additional structural strength or reinforcement or to provide framing for a window or door assembly or the like. Again, modular floor/ceiling assemblies 58F and modular roof assemblies 58R are constructed in generally the same manner, with appropriate differences in the orientations of the EECR modular structural assemblies 58.

As shown in FIG. 4A, and in addition to connecting adjacent EECR modular structural assemblies 58 into an integral structural unit and determining the spacing between EECR modular structural assemblies 58, purlins 22 also provide inner and outer structure surfaces 60I and 60O for attaching outer and inner sheathings 62I and 62O, such as plywood, wallboard and finishing materials, to the wall, roof and floor sections, wherein inner and outer sheathings 62I and 62O may be attached to surfaces 60I and 60O by, for example, bolts, screws, nails, adhesives, and so on.

Referring in particular to FIG. 6B, outer sheathing 62O may may be comprised, for example, of a base sheathing 62OB formed, for example, of plywood fixed to the purlins 22 by fasteners 62B, for example, bolts or adhesives, and a finish sheathing 62OF comprised, for example, of stucco or metal paneling affixed to base sheathing 62OB or to outer purlins 22 by, for example, bolts, threaded fasteners, nails or adhesives. In this regard, it should be noted that in addition to providing additional structural strength, the selection of finish sheathing 62OF will have a significant effect in determining the environmental resistance and strength of the wall assembly 10F and thus of the EECR structure 10E. For example, stucco coatings and metal paneling are fire resistant as well as providing additional resistance to penetration by wind, rain or snow and such hazards as wind-blown debris. It should also be noted that the structural elements or panels comprising outer sheathing 62O may and will typically extend horizontally over multiple modular wall sections 58W, thereby coupling adjacent modular wall sections 58W to one another and providing further structural strength to the wall. It will also be noted that additional coatings or finish layers may be added to the outer surface of outer surface 60I of the wall as needed or desired, such as paint or further finishing materials having desired structural or cosmetic properties.

Inner surface 60I of modular wall section 58W will typically be covered by an inner sheathing 62I that may be comprised, like outer sheathing 62O, of an inner base sheathing 62IB and an inner finish sheathing 62IF, such as plywood and wallboard, respectively, or of an inner finish sheathing 62IF alone, dependent on the structural and finish requirements of the inner side of the modular wall section 58W. As in the case of outer sheathing 62O, the structural elements or panels comprising inner sheathing 62I may and will typically extend horizontally over multiple modular wall sections 58W, thereby connecting adjacent modular wall sections 58W to one another and providing further structural strength to the wall. It will also be noted that additional coatings or finish layers may be added to inner surface 60I of the wall, such as paint, wallpaper or plaster or any combination thereof as needed or desired and having desired structural or cosmetic properties.

As described, a modular wall section 58W, and in particular an exterior wall section, will also typically include of a layer of insulation 10N, preferably a foam, bonded to the inner surfaces each modular wall 58W section, that is, to the inner sides of base sheathing 62OB and the purlins 22 defining outer surface 60O and the sides of the main structural assemblies 58 forming the inner sides of the modular wall section. Insulation 10N is preferably "foamed in place" and is composed to bond to the inner sides of outer base sheathing 62OB and the inner sides of main structural assembles 58 and outer purl piping, such as plumbing or gas lines, and wiring ins 22. Insulation 10N may alternatively, however, and for example, be comprised of rigid panel foam affixed to the inner surfaces of a modular wall section 58W by adhesives or of soft insulation materials, such as conventional fiberglass panels or blown fiberglass, where the additional strength of a rigid insulation structurally integral with the wall is not required.

Insulation 10N may fill the entire inner space between the inner sides of the structural elements forming the outer surface 60O and inner surface 60I of the modular wall section or, as illustrated in FIG. 6B, may be deposited as a layer on the inner sides of outer base sheathing 62OB, the purlins 22 defining outer surface 60O and the inner sides of the main structural assemblies 58 forming the inner sides of the modular wall section 58W to form an inner space 64S within the modular wall section 58W. Inner space 64S amy then be used for services 66, such as water, gas and plumbing lines, wires, vents and ducts, cables, and so on.

Lastly, it must be noted that while the floors, ceilings and roofs of an EECR structure 10E will be respectively comprised of modular floor/ceiling assemblies 58F and modular roof assemblies 58R wherein modular floor/ceiling assemblies 58F and modular roof assemblies 58R are generally similar to modular wall assemblies 58W as described above. The primary difference will be that in the case of modular floor/ceiling assemblies 58F the main structural assemblies 58 and the purlins 22 will extend generally horizontally and in the case of modular roof assemblies 58R the main structural assemblies 58 and the purlins 22 may be oriented horizontally or, more commonly, at an angle to the horizontal. In addition, modular roof assemblies 58R will typically include insulation 10N will modular floor/ceiling assemblies 58F may not have a layer of insulation 10N, and modular floor/ceiling assemblies 58F and modular roof assemblies 58R may or may not include spaces 64S, depending upon whether it is necessary or not to accommodate services 66 therein.

Since certain changes may be made in the above described method and system without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system for constructing environmentally resistant structures, the system including a plurality of types of modular structural components, each structural component including a plurality of structural elements, the structural elements comprising:

chords, each chord including
a generally elongated main body having generally square cross section defined by four main walls surrounding a central bore and having four interior main surfaces and four exterior main surfaces, and
a T-slot structure extending along and centered on each exterior main surface, each T-slot structure having an interior T-slot adapted to accept a bolt type fastener, each T-slot including a shaft slot extending inwards from an outer surface of the T-slot structure and connecting with a cross slot extending at a right angle to the shaft slot at an inner end of shaft slot, and forming strips, each forming strip including
a single generally elongated strip plate formed into a plurality of strip segments, each strip segment being oriented at a right angle with respect to an adjacent strip segment and the strip segments being formed into regions including, in succession,
  a corner region forming a w-shaped cross section forming bearing surfaces mating with corresponding chord bearing surfaces formed by two adjacent main walls and an adjacent side wall of T-slot structure,
  a face region forming a bearing surface mating with chord bearing surfaces formed by outer face surfaces of the T-slot structure, and
  an attachment region extending outwards from an edge of the face region for stiffening of the forming strip,
double chord beams, each double chord beam including
  a pair of parallel chords spaced apart by at least one beam spacer, and
double beam connectors, each double beam connector including
  a first pair of parallel chords connected and spaced apart by at least one spacer, and
  a second pair of parallel chords extending orthogonally to the first pair of parallel chords and spaced apart by a spacer with an end of each of the chords of the second pair of parallel chords affixed to one of the chords of the first pair of parallel chords.

2. The structural elements of the modular structural components of claim 1, wherein a double beam connector further comprises:
at least a third pair of parallel chords extending orthogonally to the first pair of parallel chords and spaced apart by a spacer with an end of each of the chords of the third pair of parallel chords affixed to one of the chords of the first pair of parallel chords.

3. The structural elements of the modular structural components of claim 2, wherein a double beam connector further comprises:
at least a fourth pair of parallel chords extending orthogonally to the first and second pairs of parallel chords and spaced apart by a spacer with an end of each of the chords of the fourth pair of parallel chords affixed to one of the chords of the first pair of parallel chords.

4. The structural elements of the modular structural components of claim 1, further comprising:
modular structural assemblies, each modular structural assembly including
  a pair of parallel, spaced apart double chord beams connected by purlins extending between at least one corresponding pair of chords of the pair of double chord beams, wherein
    a purlin is a single beam element formed of one of a single chord and a single forming strip and having a connection element formed of a forming strip located at each end of the single beam element.

5. The structural elements of the modular structural components of claim 1, further including a modular wall assembly, comprising:
modular structural assemblies, each modular structural assembly including
  a pair of parallel, spaced apart double chord beams connected by purlins extending between at least one corresponding pair of chords of the pair of double chord beams, wherein
    a purlin is a single beam element having a connection element at each end of the single beam element.

6. The structural elements of the modular structural components of claim 5, wherein the modular wall assembly further comprises:
a plurality of inner and outer purlins extending between and connected to corresponding inner and outer pairs of chords of the pair of double chord beams and defining inner and outer surfaces of the modular wall assembly.

7. The structural elements of the modular structural components of claim 6, wherein the modular wall assembly further comprises:
an outer sheathing affixed to the outer purlins of the outer surface of the modular wall assembly, and
an inner sheathing affixed to the inner purlins of the inner surface of the modular wall assembly.

8. The structural elements of the modular structural components of claim 7, wherein the modular wall assembly further comprises:
at least the outer sheathing includes a base sheathing affixed to the purlins of the outer surface of the modular wall assembly, and
a finish sheathing affixed to an outer side of the base sheathing.

9. The structural elements of the modular structural components of claim 7, wherein the modular wall assembly further comprises:
insulation affixed to the inside surfaces of the outer purlins.

10. The structural elements of the modular structural components of claim 9, wherein the modular wall assembly further comprises:
an inner space located between the insulation and the inner sheathing for accommodation of services.

11. The structural elements of the modular structural components of claim 1, further including at least one of modular floor/ceiling assemblies and roof assemblies, each modular floor/ceiling assembly and each modular roof assembly comprising:
a modular structural assembly, including
  a pair of parallel, spaced apart double chord beams connected by a plurality of purlins extending between at least an outer pair of chords of the pair of double chord beams and defining an outer surface of the modular structural assembly, wherein
    each purlin is a single beam element having a connection element at each end of the single beam element and the, and
  an outer sheathing affixed to the outer purlins of the modular wall assembly.

12. The structural elements of the modular structural components of claim 11, wherein the outer sheathing of each modular floor/ceiling assembly and modular roof assembly further comprises:
a base sheathing affixed to the purlins of the outer surface of the modular wall assembly, and
a finish sheathing affixed to an outer side of the base sheathing.

13. The structural elements of the modular structural components of claim 11, wherein each modular roof assembly further comprises:
insulation affixed to the surfaces of the outer purlins.

14. The structural elements of the modular structural components of claim 1, further including attachment elements, each attachment element comprising:
a segment of forming strip permanently attached to a structural component to mate with a chord of another structural component and having at least one bolt hole located for attachment of the segment of forming strip to the other structural component.

15. The structural elements of the modular structural components of claim 1, wherein each structural component includes at least one bolt hole for receiving a bolt-type connector for connecting one structural component to another structural component.

16. The structural elements of the modular structural components of claim 1, wherein at least selected ones of the structural components include bolt holes spaced along the selected structural component for the attachment of other structural components to the selected structural component.

17. The structural elements of the modular structural components of claim 1, wherein a forming strip further includes at least one bolt hole accepting a bolt type fastener for attachment of the forming strip to a chord by means of at least one of a T-bolt mating with a T-slot structure of the chord and a hex-bolt mating with a bolt hole extending traversely through the chord wherein the at least one bolt hole extends through the shaft slots and cross slots of opposing T-slot structures of the chord.

18. The structural elements of the modular structural components of claim 1, wherein:
  each T-slot structure is defined by two parallel slot side walls extending outwardly in parallel from an exterior main surface of a chord and by two slot face walls extending inwardly from the outer edges of the slot side walls and parallel to the exterior main surface.

19. The structural elements of the modular structural components of claim 1, wherein:
  the bolt-type fasteners include at least one of standard hex-bolts and T-bolts, and wherein
  a T-bolt has a rectangular head portion longer than the width of a cross slot and narrower than a width of a shaft slot, so that
    the head portion of a T-bolt can pass through the shaft slot and into the cross slot of a T-slot when the head portion of the T-bolt is aligned with a longitudinal axis of the T-slot and will be retained in the cross slot when the head portion is rotated to an orientation transverse to the longitudinal axis of the T-slot.

20. The structural elements of the modular structural components of claim 19, wherein:
  at least one inner surface of each T-slot is a bearing surface to support compressive forces resulting from tensional and torsional forces imposed through a T-bolt and wherein each plane defined by an innermost face of each cross slot is offset inwardly with respect to a corresponding exterior main wall surface of the chord, thereby forming an increased and diagonal main wall thickness between planes defined by the interior surfaces of each cross slot and a corresponding exterior main surface of the chord.

21. The structural elements of the modular structural components of claim 1, wherein:
  the bearing surfaces of a chord and of a forming strip form a mutually mating configuration such that up to four forming strips may be mated to a given location along a chord with each forming strip mating to a corresponding one of the four exterior main surfaces of the chord.

22. The structural elements of the modular structural components of claim 1, further including a connection structure for structurally attaching a first structural component to a second structural component, each connection structure comprising:
  a segment of chord forming a permanent integral element of one of the first and second structural components,
    a chord including
      a generally elongated main body having generally square cross section defined by four main walls surrounding a central bore and having four interior main surfaces and four exterior main surfaces, and
      a T-slot structure extending along and centered on each exterior main surface, each T-slot structure having an interior T-slot adapted to accept a bolt type fastener, each T-slot including a shaft slot extending inwards from an outer surface of the T-slot structure and connecting with a cross slot extending at a right angle to the shaft slot at an inner end of shaft slot, and
  a segment of forming strip forming a permanent integral element of another of the first and second structural components,
    a forming strip including
      a single generally elongated strip plate formed into a plurality of strip segments, each strip segment being oriented at a right angle with respect to an adjacent strip segment and the strip segments being formed into regions including, in succession,
        a corner region forming a w-shaped cross section forming bearing surfaces mating with corresponding chord bearing surfaces formed by two adjacent main walls and an adjacent side wall of T-slot structure,
        a face region forming a bearing surface mating with chord bearing surfaces formed by outer face surfaces of the T-slot structure, and
        an attachment region extending outwards from an edge of the face region for stiffening of the forming strip, and
      at least one bolt hole located in the face region of the forming strip and accepting a bolt type fastener for attachment of the forming strip to the chord by means of at least one of a T-bolt mating with a T-slot structure of the chord and of a hex-bolt mating with a bolt hole extending traversely through the chord wherein the at least one bolt hole extends through the shaft slots and cross slots of opposing T-slot structures of the chord.

23. The structural elements of the modular structural components of claim 22, wherein the connection structure further comprises:
  each T-slot structure is defined by two parallel slot side walls extending outwardly in parallel from an exterior main surface of a chord and by two slot face walls extending inwardly from the outer edges of the slot side walls and parallel to the exterior main surface.

24. The structural elements of the modular structural components of claim 22, wherein the connection structure further comprises:
  the bearing surfaces of a chord and of a forming strip form a mutually mating configuration such that up to four forming strips may be mated to a given location along a chord with each forming strip mating to a corresponding one of the four exterior main surfaces of the chord.

25. The structural elements of the modular structural components of claim 1 further including modular wall sections, each wall section comprising:
  a vertically oriented inner face element, a vertically oriented outer face element and at least one horizontally oriented interior spacer connected between and spacing apart the inner and outer face elements.

26. The structural elements of the modular structural components of claim 25, wherein:

each inner and outer face element is one of a chord and a forming strip, and each interior spacer is one of a chord and a forming strip having an attachment element at each end of the interior spacer for connecting the interior spacer to the inner and outer face elements, each attachment element including a segment of forming strip permanently attached to a structural component to mate with a chord of another structural component and having at least one bolt hole located for attachment of the segment of forming strip to the other structural component.

27. The structural elements of the modular structural components of claim 25, wherein each wall section further includes:

an inner sheathing attached to the inner face element and an outer shearing attached to the outer face element.

28. The structural elements of the modular structural components of claim 27, wherein each wall section further includes:

foam insulation filling a space between the inner and outer sheathing and contiguous with foam insulation filler of an adjoining wall section.

29. The structural elements of the modular structural components of claim 1 further including at least one of roof sections and floor sections, each roof section and each floor section comprising:

an inner face element, an outer face element and at least one interior spacer connected between and spacing apart the inner and outer face elements.

30. The structural elements of the modular structural components of claim 29, wherein:

each inner and outer face element is one of a chord and a forming strip, and each interior spacer is one of a chord and a forming strip having an attachment element at each end of the interior spacer for connecting the interior spacer to the inner and outer face elements, each attachment element including a segment of forming strip permanently attached to a structural component to mate with a chord of another structural component and having at least one bolt hole located for attachment of the segment of forming strip to the other structural component.

* * * * *